(12) United States Patent  (10) Patent No.: US 7,533,039 B2
Hoffman et al.  (45) Date of Patent: May 12, 2009

(54) BULK ORDERING

(75) Inventors: George H. Hoffman, Miramar, FL (US); George Fotiadis, Miami Beach, FL (US)

(73) Assignee: Restaurant Services, Inc., Coral Gables, FL (US)

( * ) Notice: Subject to any disclaimer, the term of this patent is extended or adjusted under 35 U.S.C. 154(b) by 680 days.

(21) Appl. No.: 10/815,691

(22) Filed: Apr. 2, 2004

(65) Prior Publication Data

US 2005/0010496 A1    Jan. 13, 2005

Related U.S. Application Data

(60) Provisional application No. 60/459,988, filed on Apr. 4, 2003.

(51) Int. Cl.
*G06Q 30/00* (2006.01)
(52) U.S. Cl. .......................................... 705/26; 705/27
(58) Field of Classification Search ................... 705/26, 705/27
See application file for complete search history.

(56) References Cited

U.S. PATENT DOCUMENTS

| | | | |
|---|---|---|---|
| 6,351,738 B1 * | 2/2002 | Clark ........................... | 705/37 |
| 6,934,692 B1 * | 8/2005 | Duncan ........................ | 705/35 |
| 7,124,107 B1 * | 10/2006 | Pishevar et al. ............... | 705/37 |
| 2002/0147726 A1 * | 10/2002 | Yehia et al. ................... | 707/101 |
| 2002/0169679 A1 * | 11/2002 | Neumayer .................... | 705/26 |
| 2003/0115119 A1 * | 6/2003 | Schleicher .................... | 705/35 |
| 2004/0107141 A1 * | 6/2004 | Conkel et al. ................. | 705/15 |

OTHER PUBLICATIONS

Summit Racing: Internet Archive Wayback Machine, www.archive.org, www.summitracing.com; 02, Dec. 14, 2001; Jan. 26, 2002; 04, Jun. 19, 2002; 6pgs.*
RSI: "Restaurant Services, Inc moves Burger King Systems on-line with Amphire," Business Wire, Mar. 5, 2002, 2pgs.*

* cited by examiner

*Primary Examiner*—Robert M. Pond
(74) *Attorney, Agent, or Firm*—Foley & Lardner LLP

(57)  ABSTRACT

A program product, system and method for a computer-implemented product ordering process for a plurality of buyers, with each buyer ordering for at least one store, the program product comprising machine-readable program code to be executed, comprising: program code for receiving in a supply chain system from a buyer who has entered a buyer system ID a selection of an item to order; program code for providing a display option to the buyer to generate an order to a supplier for an individual store only or to order for a plurality of stores of the buyer; program code for, if an order is to be generated for a plurality of stores of the buyer, displaying an electronic order form for generating an order for the plurality of different stores associated with the buyer system ID, wherein a designation for each of the plurality of the stores is displayed, with each different store having a separate order amount field; program code for receiving data to populate the order amount field for at least one of the plurality of stores; and program code for sending out the electronic order form to at least one supplier. In one embodiment, a graphical buyer interface is provided to present an option to automatically populate the order amount field for each of a plurality of the stores with a quantity entered in the order amount field for one of the stores.

42 Claims, 39 Drawing Sheets

RSI Home Page

RSI eRedBook Home Page eRedBook Category Landing Page eRedBook Product Listing Page Select Product Price

322

Add Product to Shopping Cart

Select Shopping Method

Ship To Multiple Restaurants (1)

Ship To Multiple Restaurants (1a)

Edit Shipping Instructions

Shipping Method Pop Up Window (1)

Shipping Method Pop Up Window (1a)

Use Same Shipping Method for All Restaurants (1)

Select Checkout

Shopping Cart Step One
Review Cart Items

Shopping Cart Step Two –
Billing & Shipping

Shopping Cart Step Three
Payment Options

Shopping Cart Step Four
Review & Submit Order (1)

Shopping Cart Step Four
Review & Submit Order (1a)

Shopping Cart Step Four
Select View by Ship To Address

Shopping Cart Step Four
View By Supplier

Shopping Cart Step Four
View By Ship to Address (1)

Shopping Cart Step Four
View By Ship to Address (1a)

RSI eRedBook Bulk Order Functionality – Supplier Workspace

RSI Supplier Home Page

RSI eRedBook Bulk Order Functionality – Supplier Workspace

372

RSI eRedBook Supplier Home Page

RSI eRedBook Bulk Order Functionality – Supplier Workspace eRedBook Supplier Bulk Order Detail Page (1a)

Fig. 3BB

RSI eRedBook Bulk Order Functionality – Supplier Workspace eRedBook Supplier Bulk Order Detail Page (1b)

Fig. 3CC

RSI eRedBook Bulk Order Functionality – Supplier Workspace eRedBook Supplier Bulk Order Detail Page (1c)

Fig. 3DD

RSI eRedBook Bulk Order Functionality – Supplier Workspace eRedBook Supplier Bulk Order Detail Page – View by Item Display

Fig. 3EE

RSI eRedBook Bulk Order Functionality – Supplier Workspace eRedBook Supplier Bulk Order Detail Page – View by Address Display

Fig. 3FF

RSI eRedBook Bulk Order Functionality – Supplier Workspace eRedBook Supplier Bulk Order Details Review/Ship Page (1a)

Fig. 3GG

RSI eRedBook Bulk Order Functionality – Supplier Workspace eRedBook Supplier Bulk Order Details Review/Ship Page (1b)

Fig. 3HH

RSI eRedBook Bulk Order Functionality – Supplier Workspace eRedBook Supplier Bulk Order Details Review/Ship Page (1c)

Item A

Store 1        quantity _____

Store 2        quantity _____

Store 3        quantity _____

Store 4        quantity _____

FIG. 3KK

Store Address 1

Item A         quantity _____

Item B         quantity _____

Item C         quantity _____

Item D         quantity _____

BULK ORDERING

CROSS-REFERENCE TO RELATED PATENT APPLICATIONS

This application is an application claiming the benefit under 35 USC 119(e) of U.S. application Ser. No. 60/459,988, filed Apr. 4, 2003, incorporated herein by reference in its entirety.

BACKGROUND OF THE INVENTION

The purchase of production equipment for franchise stores is typically uncoordinated and is performed by one of more managers with minimal experience in making such purchases.

SUMMARY OF THE INVENTION

In one embodiment of the present invention, a program product is provided for a computer-implemented product ordering process for a plurality of buyers, with each buyer ordering for at least one store, comprising machine-readable program code to be executed, comprising: program code for receiving in a supply chain system from a buyer who has entered a buyer system ID a selection of an item to order; program code for providing a display option to the buyer to generate an order to a supplier for an individual store only or to order for a plurality of stores of the buyer; program code for, if an order is to be generated for a plurality of stores of the buyer, displaying an electronic order form for generating an order for the plurality of different stores associated with the buyer system ID, wherein a designation for each of the plurality of the stores is displayed, with each different store having a separate order amount field; program code for receiving data to populate the order amount field for at least one of the plurality of stores; and program code for sending out the electronic order form to at least one supplier.

In a further embodiment, a graphical buyer interface is provided to present an option to automatically populate the order amount field for each of a plurality of the stores with a quantity entered in the order amount field for one of the stores.

In a further embodiment, program code is provided for displaying a fulfillment electronic form to a supplier designated in the electronic order form, wherein when a store organization is displayed a different store fulfillment section in the fulfillment electronic order form is associated with each different one of the stores associated with that buyer system ID, with each such store fulfillment section listing the items ordered for that store and with each such different listed item in the fulfillment section having at least one parameter field to be populated, or when an item organization is displayed a different item fulfillment section in the electronic order form is associated with each different item ordered from the supplier for the stores associated with that buyer system ID, with each different item in the fulfillment section having at least one parameter field to be populated; program code is provided for receiving information to populate the parameter field for one of the items when in a store organization or one of the stores when in an item organization in one of the fulfillment sections; program code is provided for providing an electronic option to automatically populate the parameter field for another item or store in the fulfillment section based on the information; and program code is provided for, if the electronic option is taken, then automatically populating the parameter field in the other item or store in the fulfillment section based on the information.

In a further embodiment, a program product is provided for a computer-implemented product ordering process for a plurality of suppliers, with each supplier fulfilling electronic orders for a plurality of stores, comprising machine-readable program code to be executed, comprising: program code for generating an electronic order form for a plurality of stores associated with a buyer system ID to at least one supplier; program code for displaying a fulfillment electronic form to the supplier, with each different fulfillment section in the fulfillment electronic order form either associated with a different store from a group of stores associated with that buyer system ID and listing in the fulfillment section the items ordered for that store and with each different listed item in the fulfillment section having at least one parameter field to be populated (a store organization), or associated with a different item ordered from the supplier and listing in the fulfillment section the stores associated with that buyer system ID that are being supplied with that item and with each different listed item in the fulfillment section having at least one parameter field to be populated (an item organization); program code for receiving information to populate one of the parameter fields for one of the items in a store organization or one of the stores in an item organization in one of the fulfillment sections; program code for providing an electronic option to automatically populate the parameter field in another item or store in said one fulfillment section based on the information; and program code for, if the electronic option is taken, then automatically populating the parameter field in the other item or store based on the information.

In a further embodiment, a system for a computer-implemented product ordering process for a plurality of buyers is provided, with each buyer ordering for at least one store, comprising: at least one processor comprising logic code for receiving in a supply chain system from a buyer who has entered a buyer system ID a selection of an item to order; logic for providing a display option to the buyer to generate an order to a supplier for an individual store only or to order for a plurality of stores of the buyer; logic code for, if an order is to be generated for a plurality of stores of the buyer, displaying an electronic order form for generating an order for the plurality of different stores associated with the buyer system ID, wherein a designation for each of the plurality of the stores is displayed, with each different store having a separate order amount field; logic for receiving data to populate the order amount field for at least one of the plurality of stores; and logic for sending out the electronic order form to at least one supplier.

In a further embodiment, logic is provided for displaying a fulfillment electronic form to a supplier designated in the electronic order form, wherein when a store organization is displayed a different store fulfillment section in the fulfillment electronic order form is associated with each different one of the stores associated with that buyer system ID, with each such store fulfillment section listing the items ordered for that store and with each such different listed item in the fulfillment section having at least one parameter field to be populated, or when an item organization is displayed a different item fulfillment section in the electronic order form is associated with each different item ordered from the supplier for the stores associated with that buyer system ID, with each different item in the fulfillment section having at least one parameter field to be populated; logic for receiving information to populate the parameter field for one of the items when in a store organization or one of the stores when in an item organization in one of the fulfillment sections; logic for providing an electronic option to automatically populate the parameter field for another item or store in the fulfillment section based on the information; and logic for if the electronic option is taken, then automatically populating the parameter field in the other item or store in the fulfillment section based on the information.

In a further embodiment, a system is provided for a computer-implemented product ordering process for a plurality of suppliers, with each supplier fulfilling electronic orders for a plurality of stores, comprising: logic for generating an electronic order form for a plurality of stores associated with a buyer system ID to at least one supplier; logic for displaying a fulfillment electronic form to the supplier, with each different fulfillment section in the fulfillment electronic order form either associated with a different store from a group of stores associated with that buyer system ID and listing in the fulfillment section the items ordered for that store and with each different listed item in the fulfillment section having at least one parameter field to be populated (a store organization), or associated with a different item ordered from the supplier and listing in the fulfillment section the stores associated with that buyer system ID that are being supplied with that item and with each different listed item in the fulfillment section having at least one parameter field to be populated (an item organization); logic for receiving information to populate one of the parameter fields for one of the items in a store organization or for one of the stores in an item organization in one of the fulfillment sections; logic for providing an electronic option to automatically populate the parameter field in another item or store in said one fulfillment section based on the information; and logic for, if the electronic option is taken, then automatically populating the parameter field in the other item or store based on the information.

In a further embodiment, a method is provided for a computer-implemented product ordering process for a plurality of buyers, with each buyer ordering for at least one store, comprising: a supply chain management computer receiving in a supply chain system from a buyer who has entered a buyer system ID a selection of an item to order; providing a display option to the buyer to generate an order to a supplier for an individual store only or to order for a plurality of stores of the buyer; if an order is to be generated for a plurality of stores of the buyer, the supply chain management computer displaying an electronic order form for generating an order for the plurality of different stores associated with the buyer system ID, wherein a designation for each of the plurality of the stores is displayed, with each different store having a separate order amount field; receiving data to populate the order amount field for at least one of the plurality of stores; and sending out the electronic order form to at least one supplier.

In a further embodiment, a graphical buyer interface is provided to provide an option to automatically populate the order amount field for each of a plurality of the stores with a quantity entered in the order amount field for one of the stores.

In a further embodiment, a method is provided for a computer-implemented product ordering process for a plurality of suppliers, with each supplier fulfilling electronic orders for a plurality of stores, comprising: a supply chain management computer generating an electronic order form for a plurality of stores associated with a buyer system ID to at least one supplier; the supply chain management displaying a fulfillment electronic form to the supplier, with each different fulfillment section in the fulfillment electronic order form either associated with a different store from a group of stores associated with that buyer system ID and listing in the fulfillment section the items ordered for that store and with each different listed item in the fulfillment section having at least one parameter field to be populated (a store organization), or associated with a different item ordered from the supplier and listing in the fulfillment section the stores associated with that buyer system ID that are being supplied with that item and with each different listed item in the fulfillment section having at least one parameter field to be populated (an item organization); receiving information to populate one of the parameter fields for one of the items in a store organization or one of the stores in an item organization in one of the fulfillment sections; providing an electronic option to automatically populate the parameter field in another item or store in said one fulfillment section based on the information; and if the electronic option is taken, then automatically populating the parameter field in the other item or store based on the information.

In a further embodiment, a selection designator is provided to allow a user to select either the store organization or the item organization for the display.

DETAILED DESCRIPTION OF THE PREFERRED EMBODIMENTS

Figure 1:
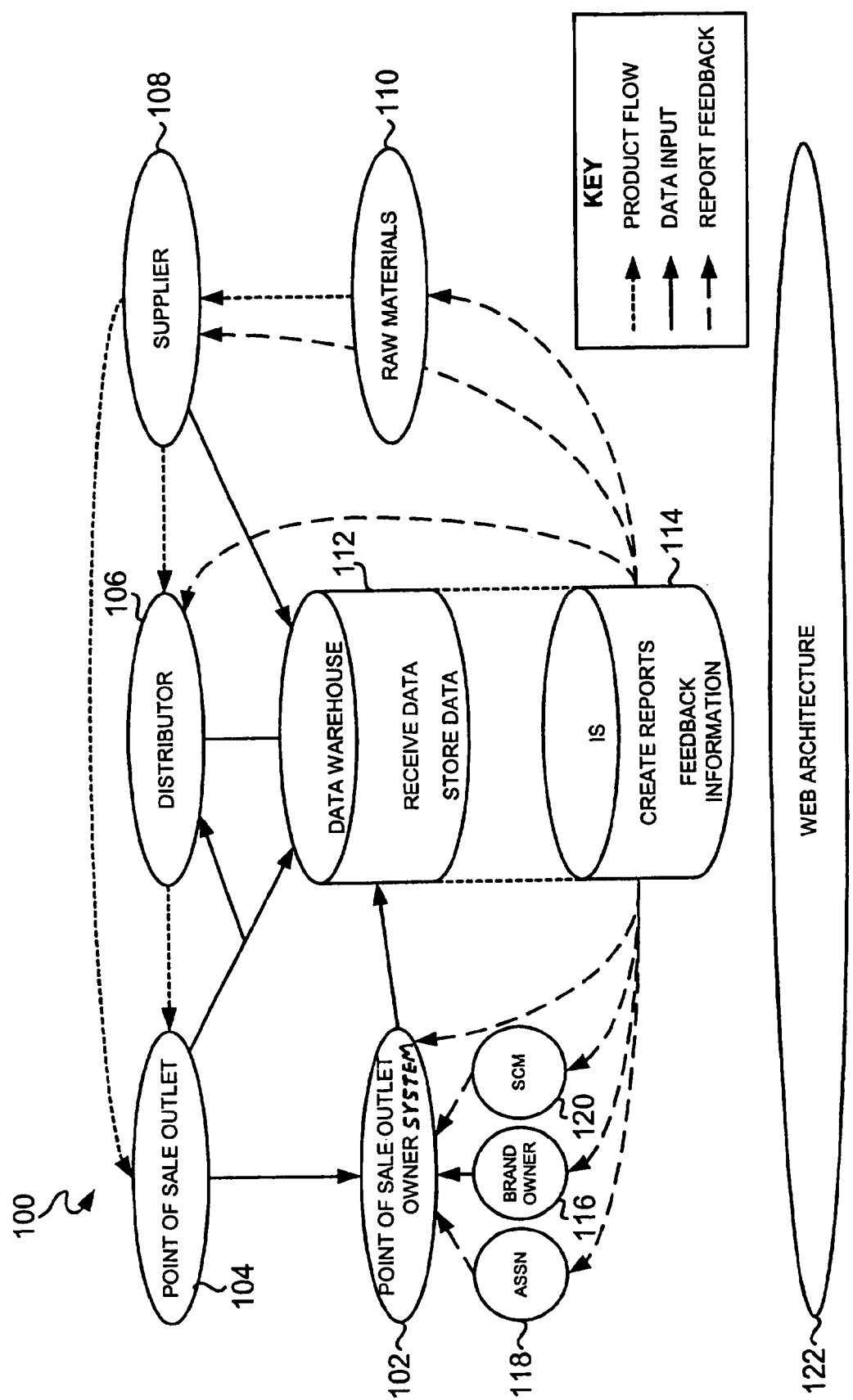
FIG. 1 is a schematic block diagram of a supply chain management system in accordance with one embodiment of the present invention.

The present invention is directed to enhancing a supply chain management system. The invention utilizes a network to provide special services relating to equipment replacement for members of the supply chain. The supply chain system may be composed of independent members and/or members affiliated with a central organization. Details of the supply chain management system are provided in application Ser. No. 09/834924 filed Apr. 13, 2001 by Hoffman et al., hereby incorporated by reference.

The present invention overcomes traditional difficulties with supply chain information flows, namely that the flow of information is fragmented, untimely, and/or nonexistent. Further, the present invention overcomes deficiencies in prior art supply chain information systems such as limited access; limited participation; and inadequate infrastructure; which result in the unavailability of accurate, timely management information from Supply Chain activities, business decisions not being based on the best information, an unfavorable impact on the cost of products, and other error prone, time consuming, and costly activities throughout the Supply Chain.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) by way of example. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Referring again to the supply chain management system of the present invention, the organizational structure, technology applications and information systems that form portions of the Supply Chain are enablers that allow for effective management of the Supply Chain. The methodology of the present invention provides the means to efficiently capture, analyze and feed back timely Supply Chain data to the appropriate parties.

The claimed invention is applicable to many different industries, including but not limited to, pharmaceuticals, health and personal care products, computer and internet technology, automotive, home product supply, food and beverage, telecommunications, machinery, air conditioning and refrigeration, chemical, department store supply, office product supply, aircraft and airline related industries, education, consumer electronics, hotel, gasoline stations, convenience stores, music and video, etc.

The present invention includes a supply chain management system involving at least one supply chain participant, and preferably multiple supply chain participants. Supply chain participants include a supply chain manager. The supply chain manager may be a supply chain participant, a department of, division of or consultant for a supply chain participant, or an independent entity unrelated to the other supply chain participants. The supply chain manager may be allowed to exercise management rights without taking title or possession of any goods passing through the supply chain.

Supply chain participants may also include brand owners, point of sale outlets, point of sale outlet owners, a cooperative or consortium of point of sale outlet owners, distributors, and suppliers. Suppliers may supply one or more of finished goods, partially finished goods or raw materials.

In general, the supply chain management system integrates various components, which components may include:

1. In-Participant Systems
2. A Retailer/Distributor Electronic Interface
3. A Supplier/Distributor Electronic Interface
4. A Data Warehouse
5. An Information Services Processing System
6. A Network such as a Web Architecture and Internet Access FIG. 1 illustrates an electronic reporting and feedback system 100 according to an embodiment of the present invention.

The In-Participant Systems 102 support point of sale outlet owners with Point of Sale (POS) and BOH (back-of-house) hardware and software solutions. This component enables electronic data collection of daily item sales for the information database. In the context of a restaurant, this collection of daily item (POS) sales might comprise menu sales. In the context of a supplier such as a factory, such POS sales might comprise inventory shipments out of the factory. Accordingly, for purposes of the present invention, the term "sales" is to be interpreted to include movement of product, either through retail sales of the product, or an inventory shipment out of a supplier.

The Retailer-Distributor Electronic Interface establishes an electronic purchasing system and thus "electronic commerce" between POS outlets 104 and distributors/"direct" suppliers 106, 108. This includes electronic order entry over the network such as via the Web, order confirmation, product delivery/receiving, electronic invoicing, electronic wire payment transfers, data collection, and contract compliance and distributor performance measurement, which assists in managing distributor performance.

The Supplier-Distributor Electronic Interface facilitates the development of electronic commerce between system suppliers and distributors and includes electronic ordering and confirmations, electronic invoicing and payments and electronic supplier performance measuring and reporting. Electronic commerce between raw material suppliers 110 and suppliers is also provided.

In one embodiment of the invention, a Data Warehouse 112 may be used to provide a central collection point (note that in other embodiments, this could be a distributed warehouse) that electronically collects and warehouses timely, critical Supply Chain information for all Supply Chain participants. This may include distributor and supplier performance measures, representations of daily outlet item sales with translations to specified product requirements, and inventory levels, and sales history and forecasts at various points in the Supply Chain, thereby providing a basis for collaborative planning and forecasting. The data stored in the Warehouse is available for quick, secure access.

Information Services analyzes 114, organizes and feeds back Supply Chain data to meet the information needs of Supply Chain buyers such as a brand owner 116, the Supply Chain Coordinator (SCC) 118, retail outlet management 120 and suppliers. This includes information on Supply Chain performance, collaborative planning and forecasting, promotion planning and inventory management. Services that benefit franchisees include electronic invoice auditing, distributor performance reporting, cost reporting and analysis, franchisee sales/cost comparables, and other reports. Information Services also determines a proper format in which to present the data so that it is in the most useful form for the end buyer. It also works with Supply Chain buyers to develop/evaluate analytical/operational tools.

A network 122 is provided to underlie this supply chain structure. In one embodiment the network may comprises a web architecture with Internet access (through proprietary service or an Internet Service Provider (ISP)) that allows these electronic communications to take place efficiently and effectively. Encompassed in this component is the building of web applications and security for the Supply Chain.

Figure 2:
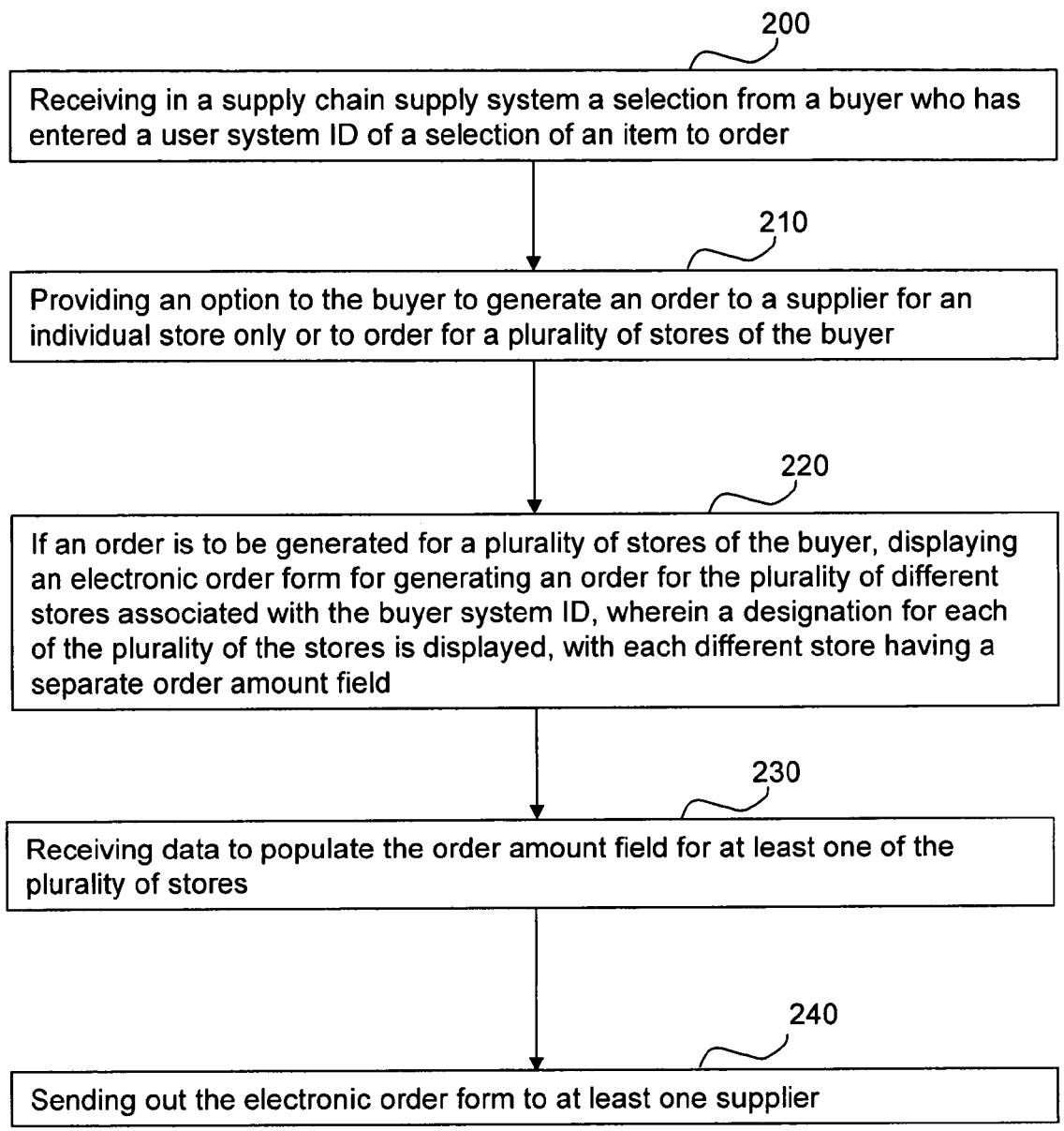
FIG. 2 is a flowchart for an implementation for one embodiment of the present invention.

Referring now to FIG. 2, a flowchart representing one embodiment of the computer-implemented product ordering process of the present invention is disclosed. As an initial operation, the buyer enters a supply chain system ID number. In one embodiment, the buyer may be a manager for a set of stores owned by a franchisee. The franchisee may have several managers, with each different manager managing a different set of stores. The supply chain system may include a stored electronic profile for each manager which lists the stores that the manager manages. The profile is accessed when the buyer enters the buyer's/manager's ID number.

Referring to block 200, the operation is provided of receiving in a supply chain system a selection of an item to be purchased for a set of stores from a buyer who has entered a supply chain system ID. The item to be purchased may be an equipment item, or a bulk food item or any other item that may be required in a supply chain. In one embodiment, the buyer may select an item from one or more suppliers from an eCatalogue using any convenient selection method.

Referring to block 210, the operation is disclosed of providing a display option via a graphical buyer interface to the buyer to generate an order to a supplier for an individual store only or to order automatically for each of a plurality of stores of the buyer. Note that the particular method of display or selection is not limiting on the invention.

If a selection input is received to order for a plurality of stores of the buyer, then in block 220 the operation is provided of displaying an electronic order form for generating an order for the plurality of different stores associated with the given buyer supply chain system ID, wherein a designation for each of the plurality of stores is displayed, with each different store having a separate order field amount. In one embodiment of the displayed electronic order form, the designation for each store includes an address for each respective store and a representation of the selected item to be purchased may be presented. By way of example, the electronic order form would be displayed on a graphical buyer interface on a computing device connected via a network to the management supply chain system.

In block 240 the operation is provided of receiving data to populate the order form amount field for at least one of the plurality of stores. In one embodiment, a separate designator may be provided to cause the quantity field populated for one store to populate the quantity field for at least one other store or all of the stores associated with that buyer system ID, i.e., all of the stores designated in the profile for that buyer/manager. If this designator is clicked or otherwise designated, the quantity field for each of these stores is then populated in the display. However, this quantity field can be subsequently manually edited or customized for the individual stores in the plurality. Thus, the quantity in the order form may be set to be the same for all of the stores in the plurality. In the alternative, the quantity field may be set using a default mode to be discussed below. Note also that in one embodiment, one or more of these order forms may designate different FOB locations of the supplier, depending on the destination store or a distributor therefore. Note that the particular method of display is not limiting on the invention.

Referring to block 240, the operation is provided of sending out the electronic order form to the supplier of at least one completed line item.

In one embodiment of the present invention, a plurality of the stores include an attribute associated therewith in the system data warehouse 112. In one embodiment, this attribute may be a quantity for the given store. Thus, a quantity of the item in the electronic order form for the particular store may be determined, at least in part, by the attribute when a default mode is selected. For example, the system may include a quantity attribute of three fryers for a first store based on the size of the store, and a quantity of one fryer for a second store based on the size of that store. When fryers are designated in the electronic order form to be ordered for the plurality of store using the default mode, the attribute three will be used to determine the quantity in the order field in the order form for the first store and the quantity one will be used in the order form for the second store.

In a further embodiment of the present invention, a same shipping method can be designated once to populate a particular shipping method to a shipping method field for all of the plurality of stores.

As noted above, in a further embodiment of the invention, the quantity field for the electronic order form may be set to be the same for all of the stores by populating a single quantity field and designating that quantity for all of the stores.

In a yet further embodiment of the present invention, the displaying a electronic order form step may comprises including a segmented permission portion thereon so that each of a plurality of different managers can enter data on a different portion only of the electronic order form, which portion is associated with one or more stores associated with that manager.

In a further embodiment of the invention, an intermediate shipping address is included for at least one of the stores. For example, this intermediate destination may be a distributor associated with the particular store. One example implementation of this embodiment comprises associating in the system an intermediate shipping destination such as a distributor with the particular store. This destination field may be overridden by the buyer. Note that in an embodiment for the purchase of food for restaurants, each store may have a distributor associated therewith, so that the electronic order forms have shipping destinations to distributors associated with the respective stores.

In yet a further embodiment of the present invention, the further steps may be provided of comparing a monetary amount on the electronic order form for a given store to a threshold amount; and generating a message if the threshold amount is exceeded.

In a yet further embodiment of the present invention, the steps may be provided of aggregating a dollar amount from a plurality of completed electronic order forms from different managers that manage different sets of stores for a given franchisee/customer; comparing the aggregated dollar amount to a threshold amount; and generating a message if the threshold amount is exceeded.

In yet a further embodiment of the present invention, the operations are provided of aggregating monetary amounts from order forms for a given supplier over a period of time; and making a calculation based on the aggregated monetary amount. This operation facilitates payments to the supply chain management system where it is independent from the stores and receives a fee from the suppliers for providing suppliers access to the system.

Figure 3A:
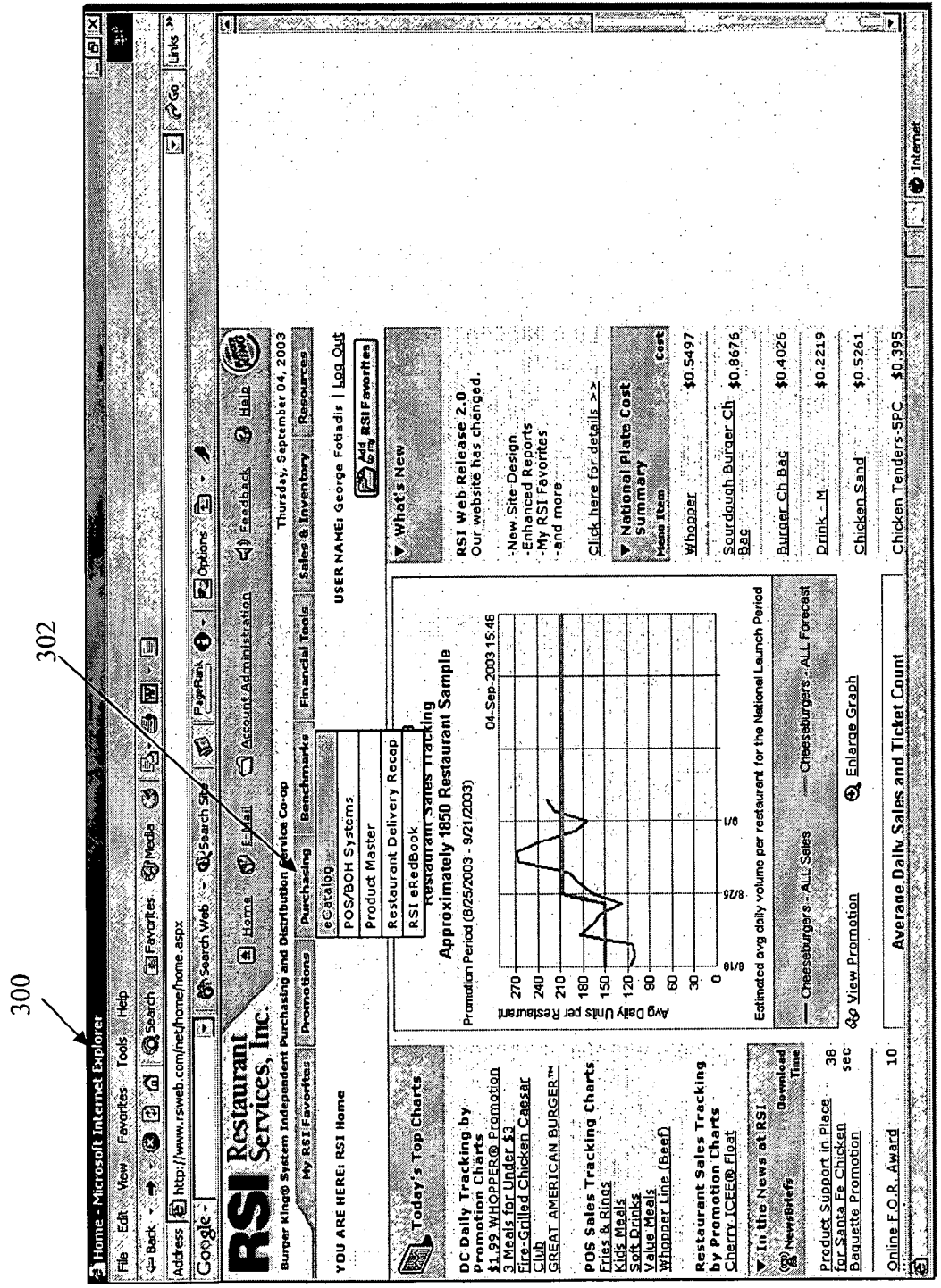
FIGS. 3A-3KK comprise a set of screen shots for a illustrating a GUI for an implementation of embodiments of the present invention. Note that there is no FIG. 3W.
Figure 3B:
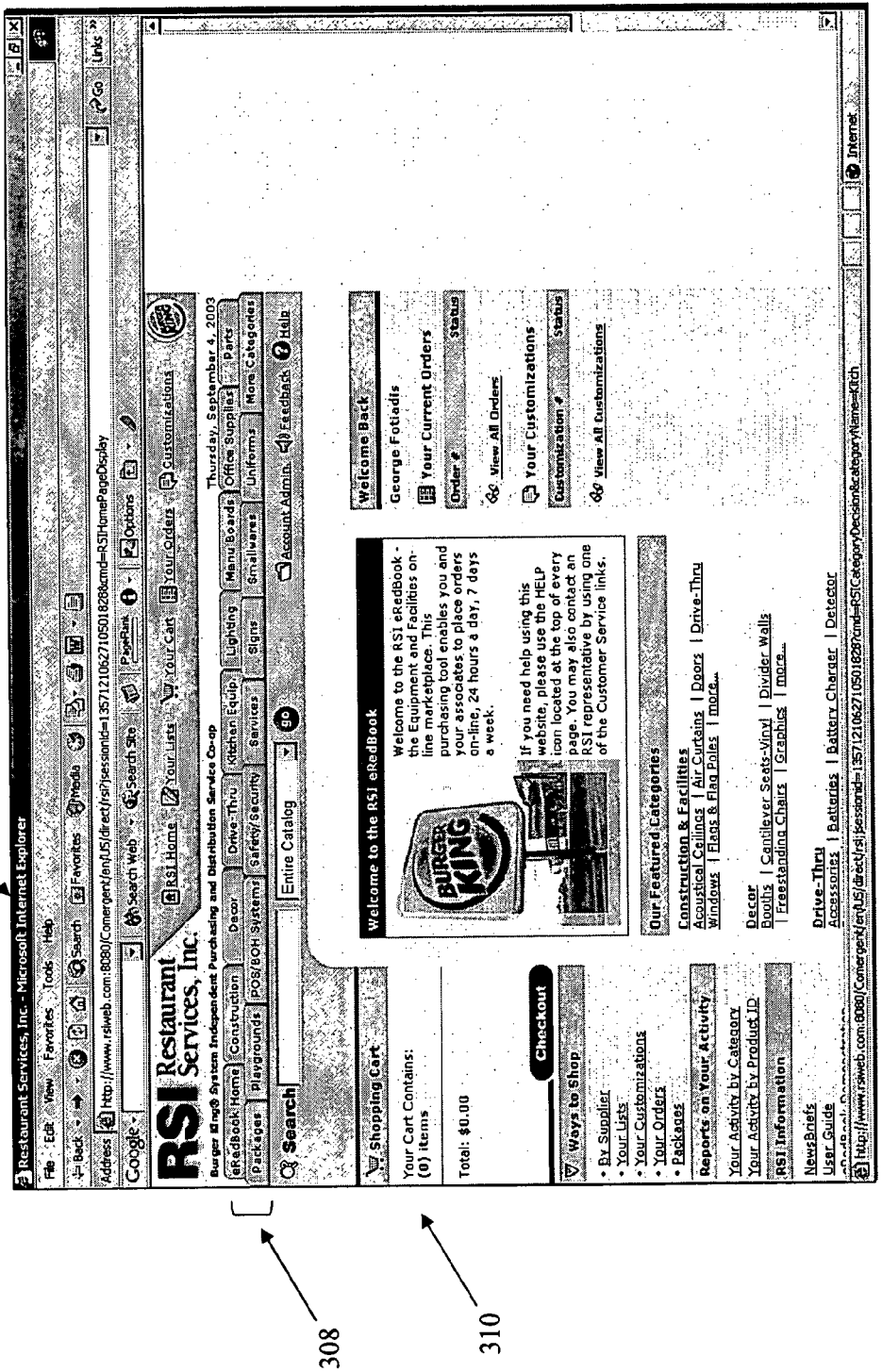
Figure 3C:
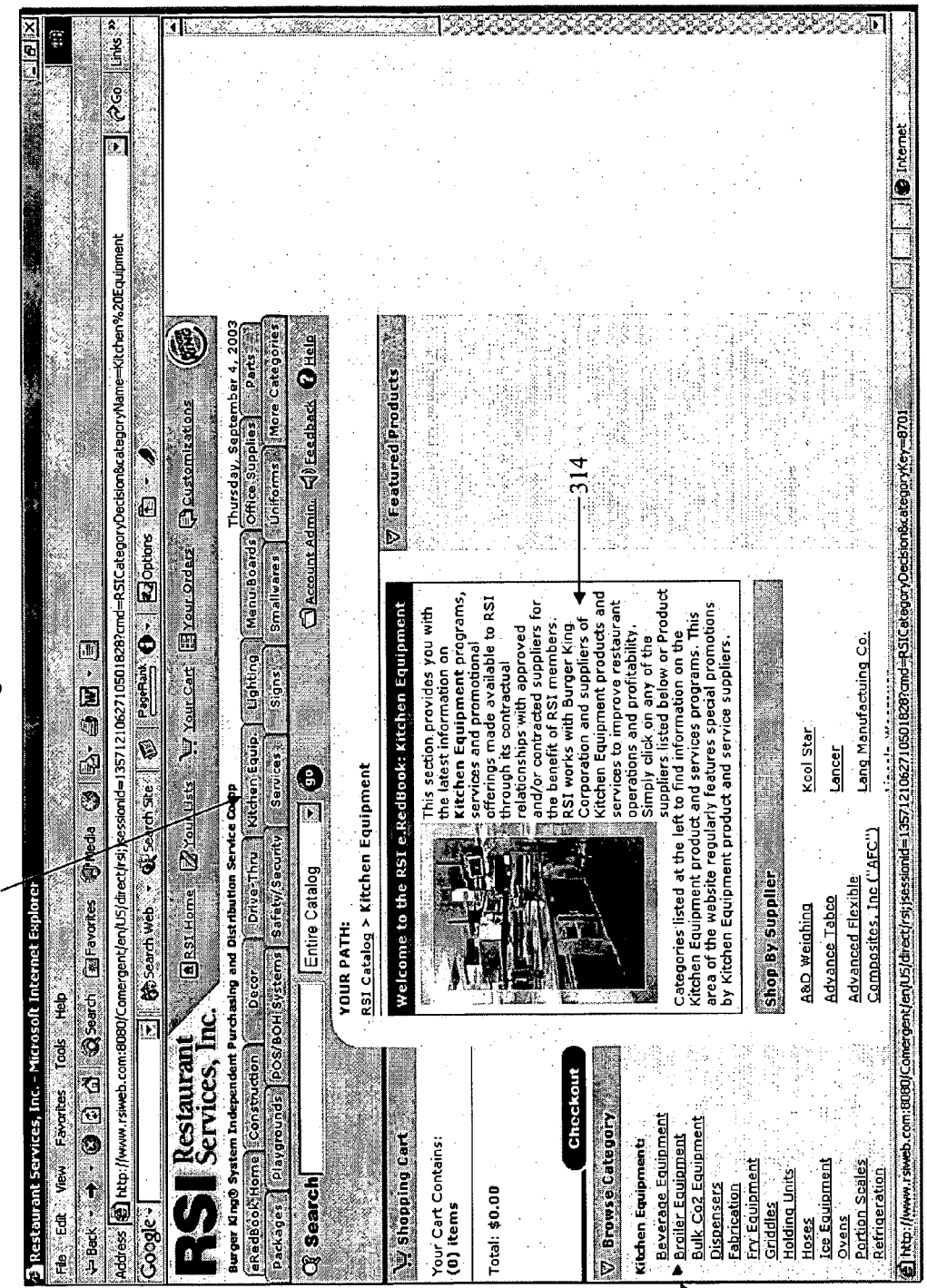
Figure 3D:
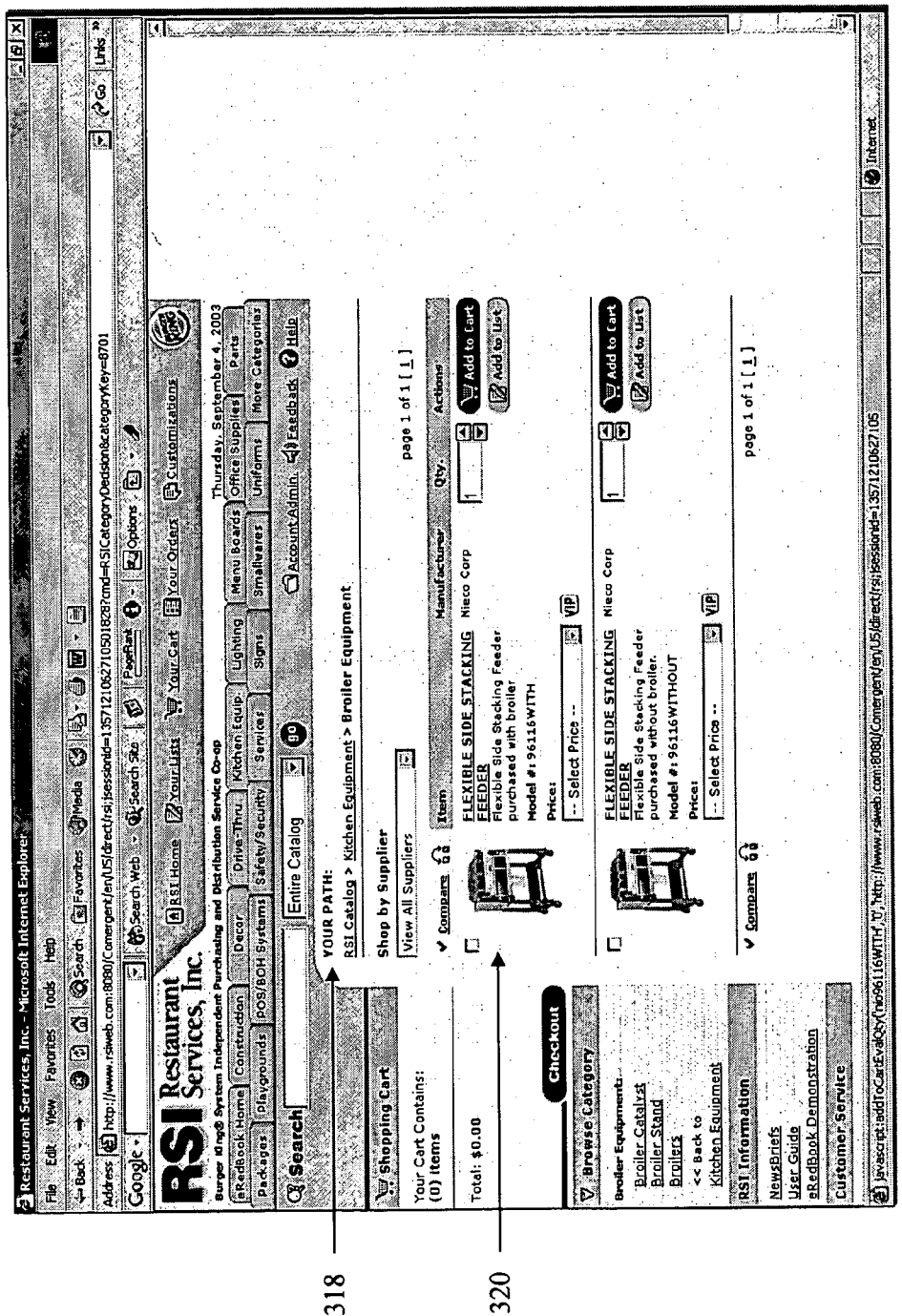
Figure 3E:
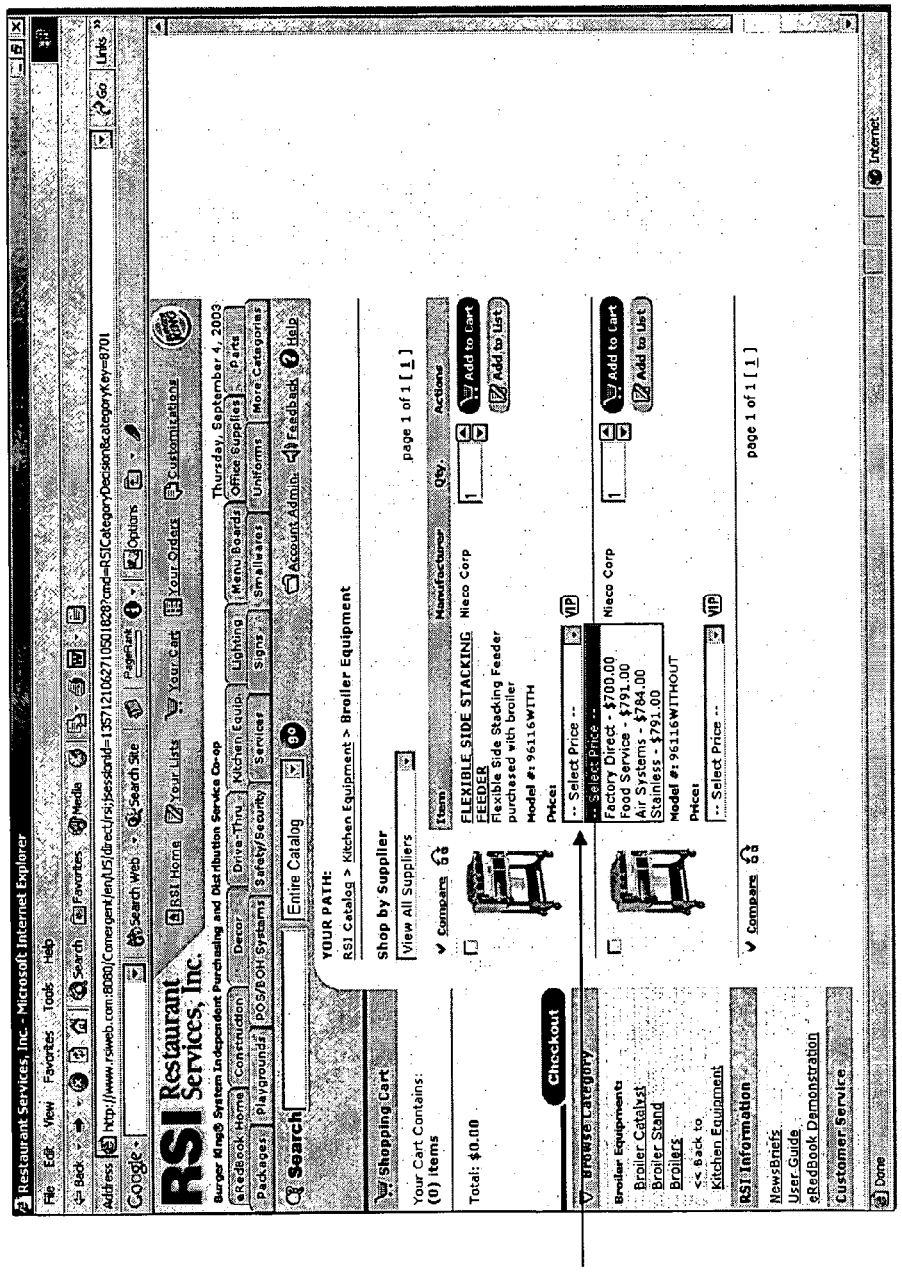
Figure 3F:
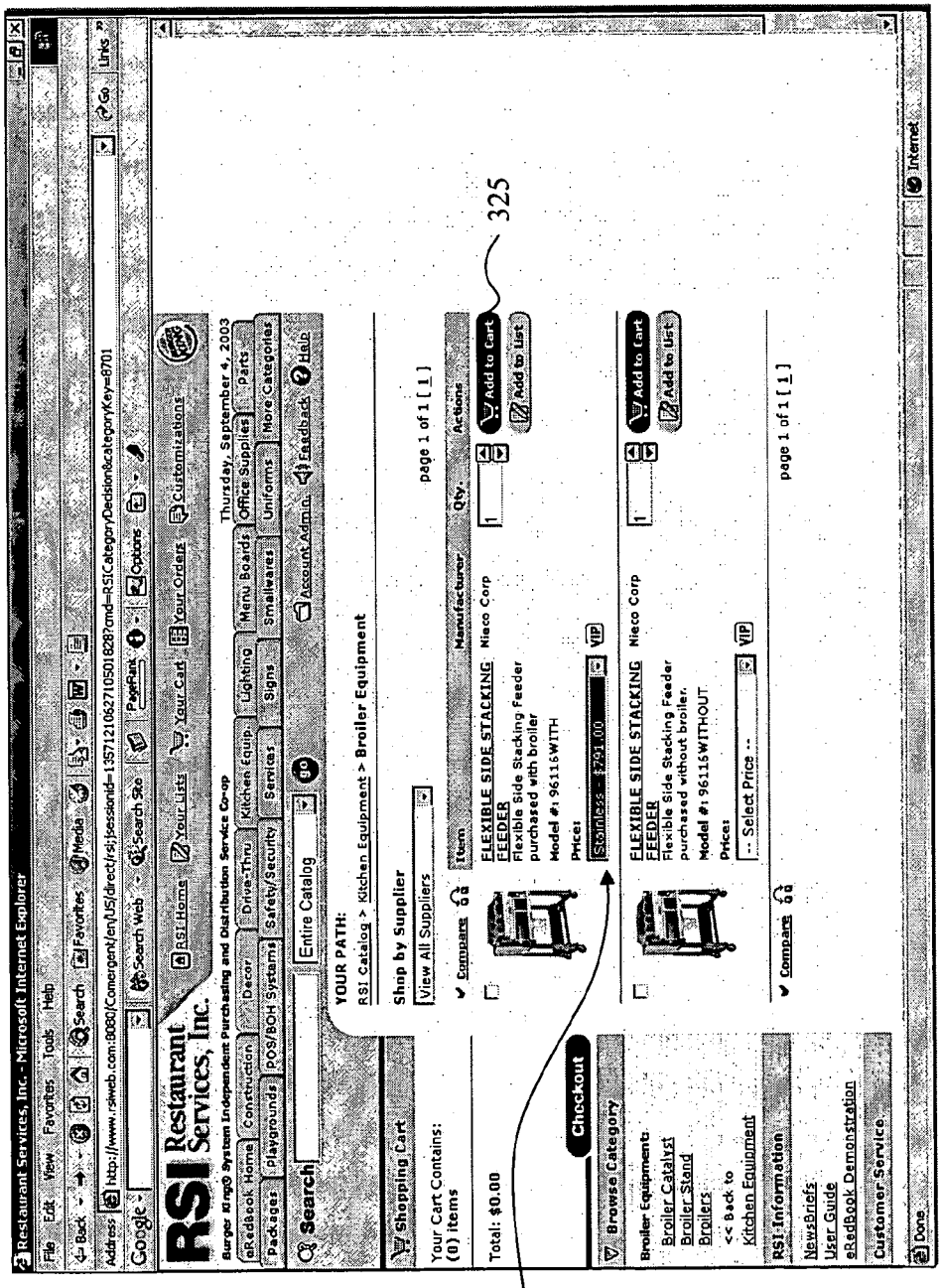
Figure 3G:
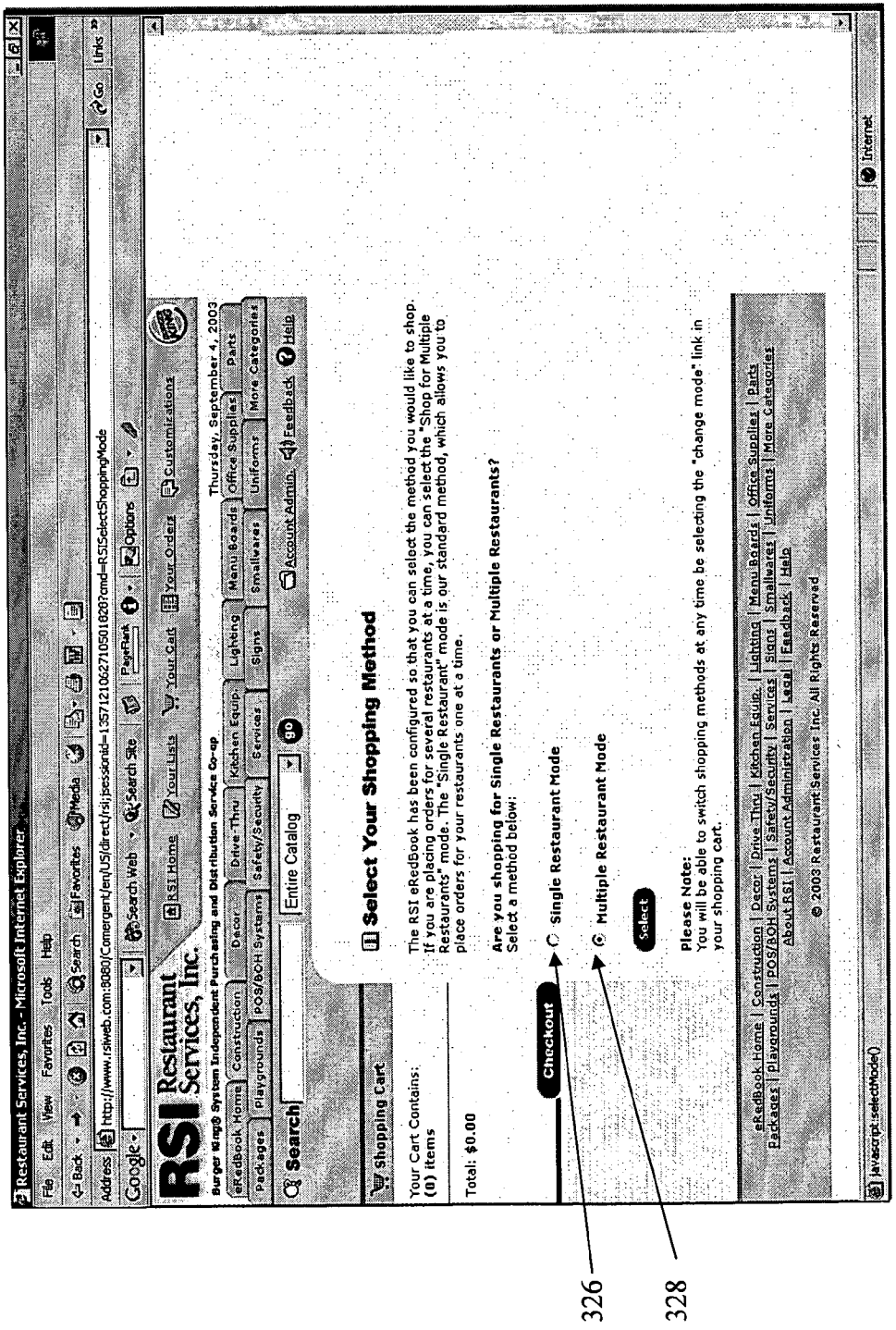
Figure 3H:
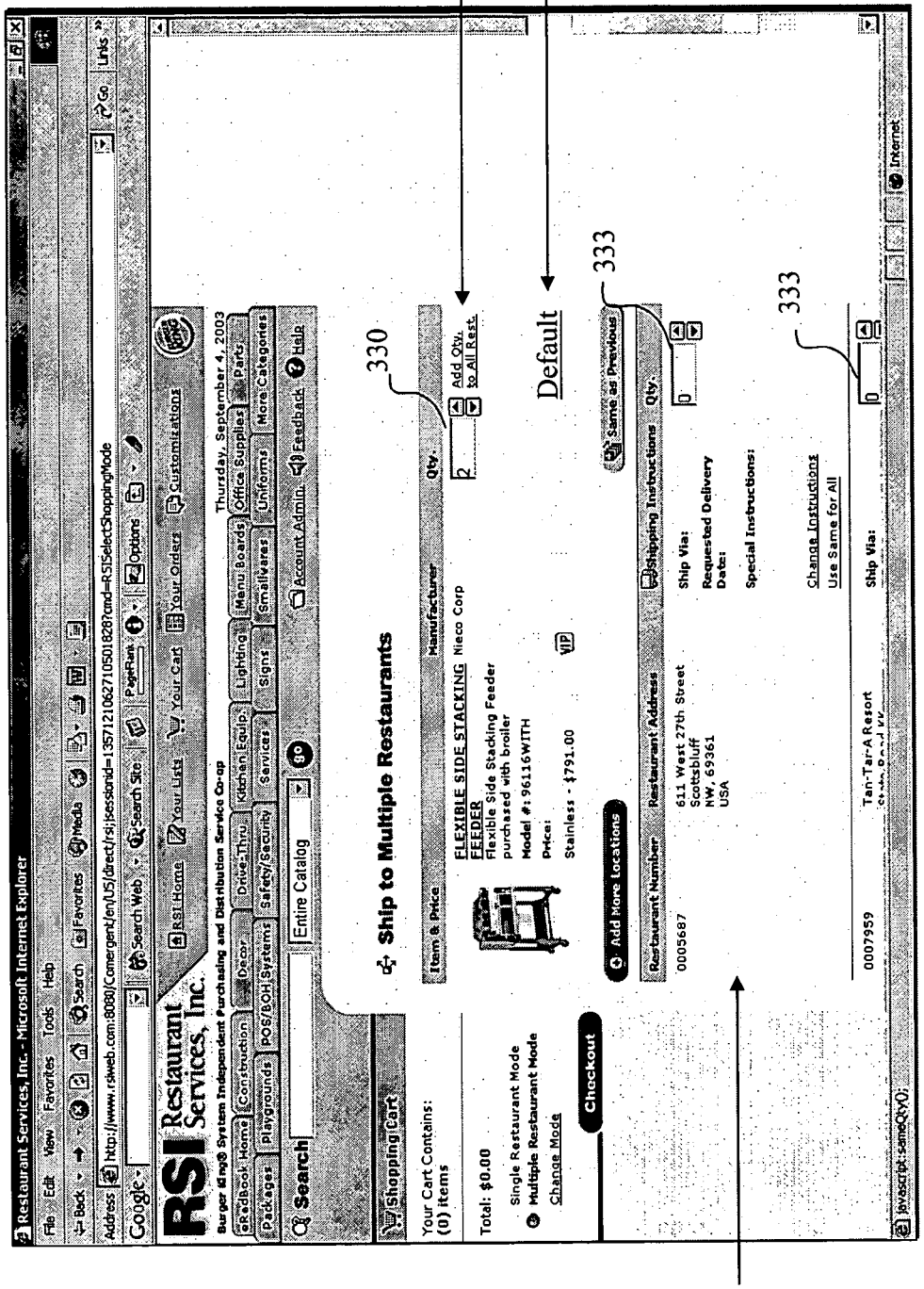
Figure 3I:
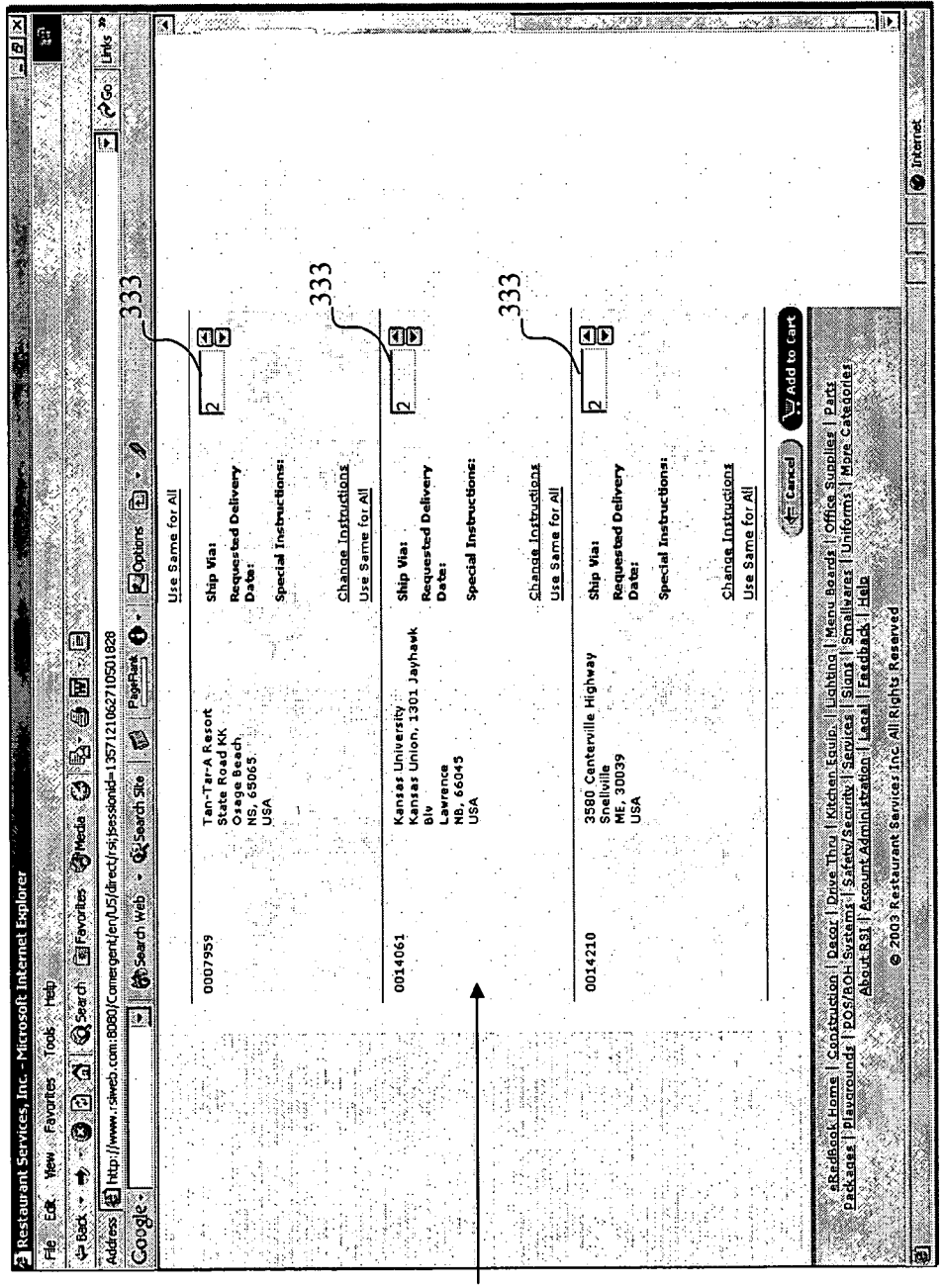
Figure 3J:
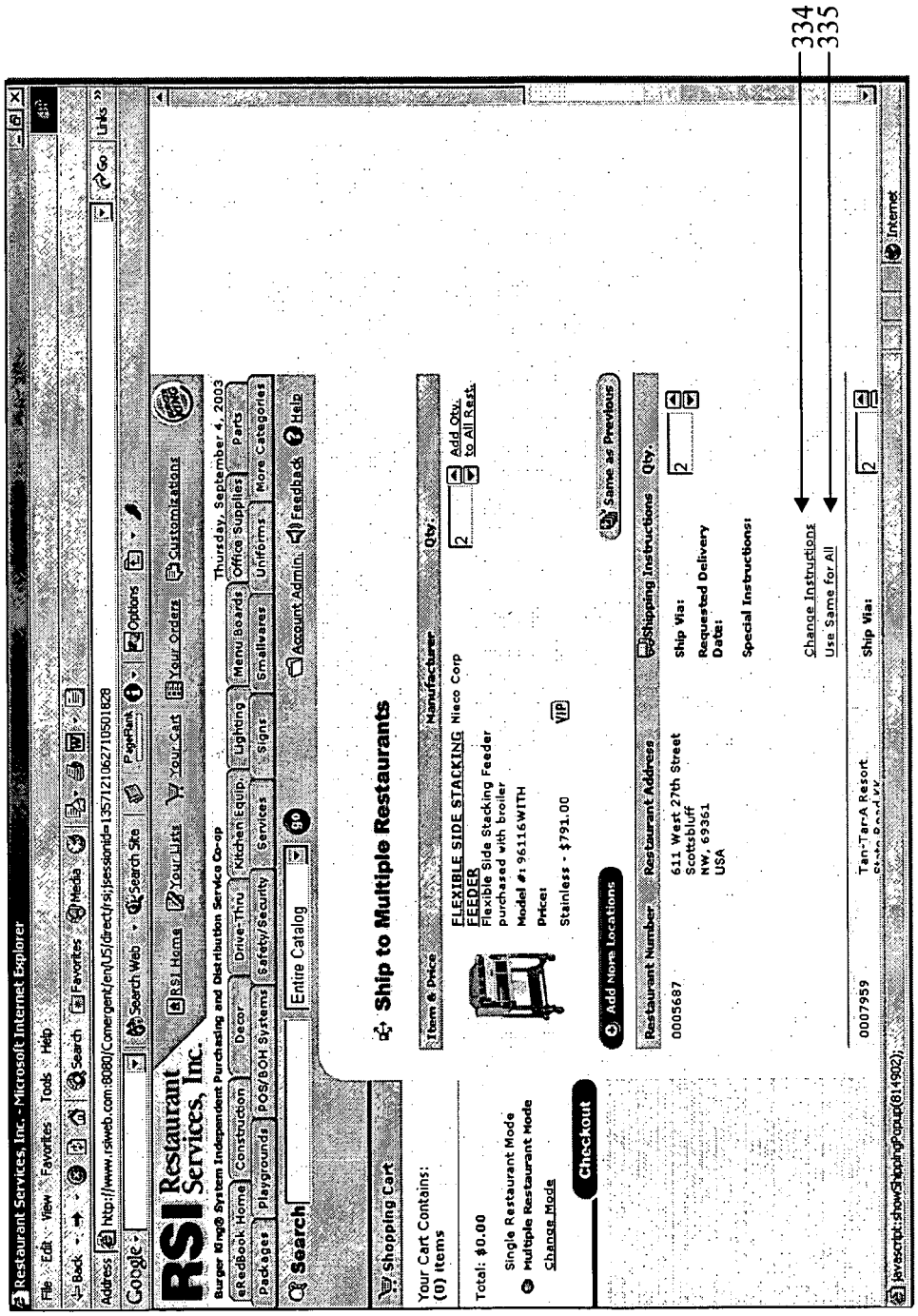
Figure 3K:
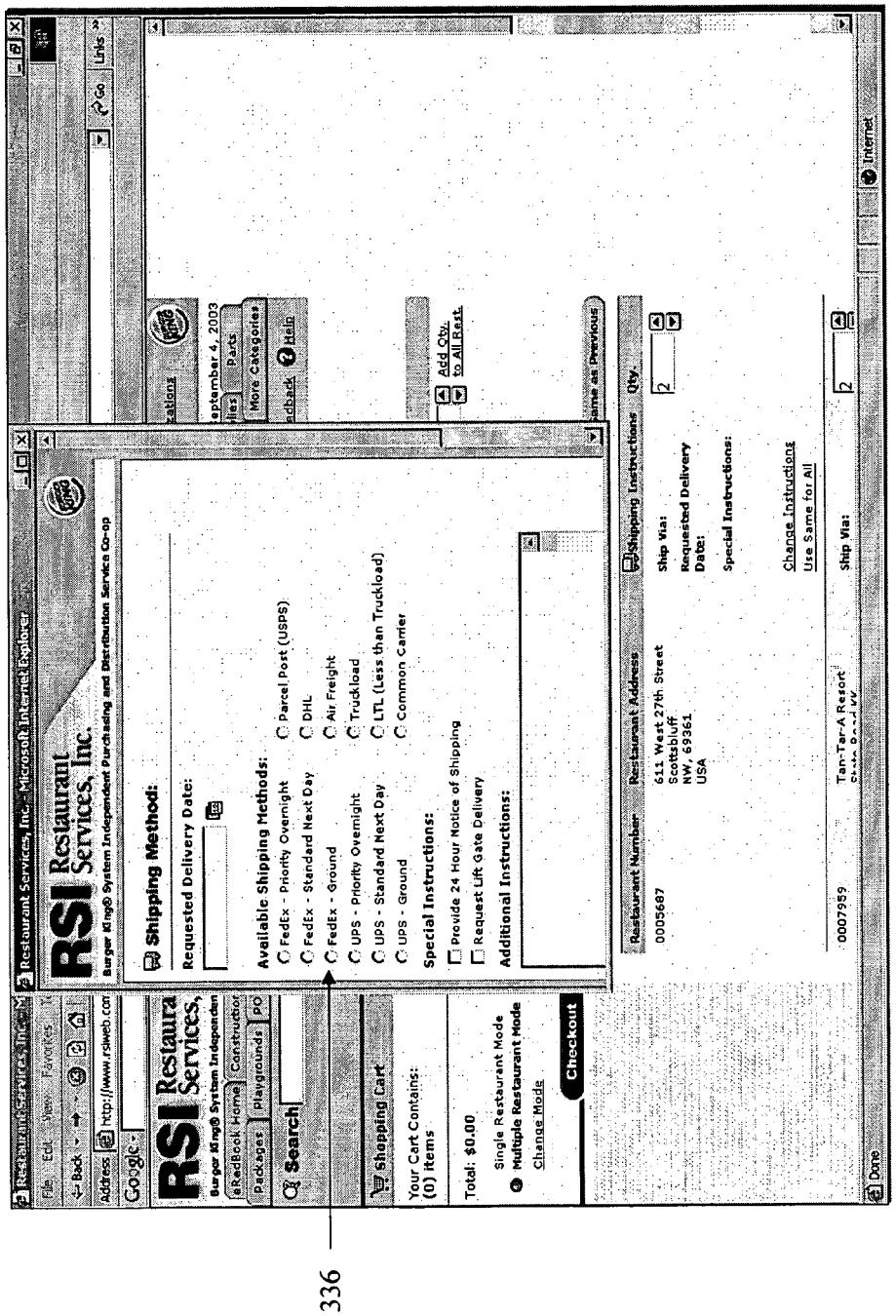
Figure 3L:
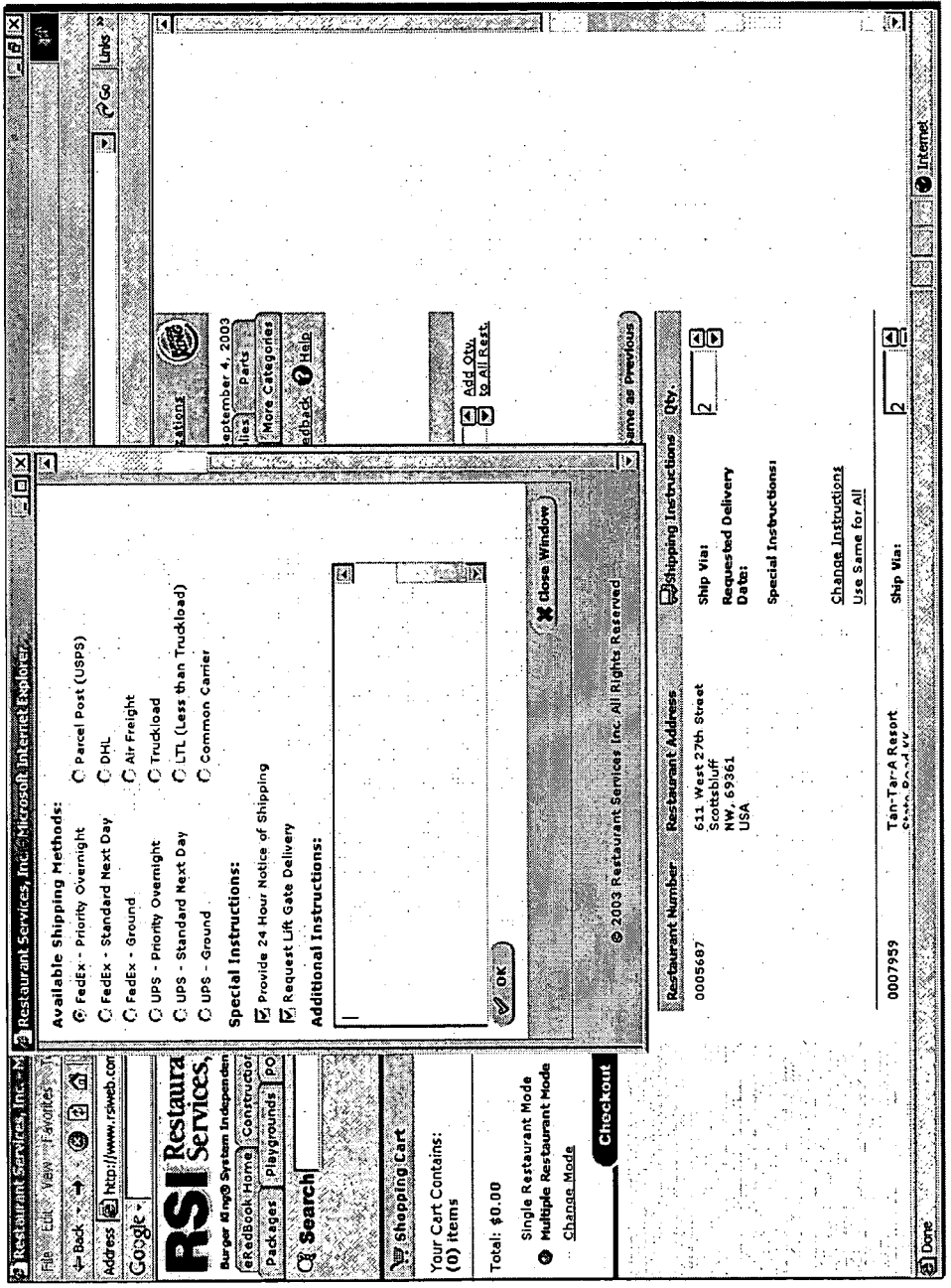
Figure 3M:
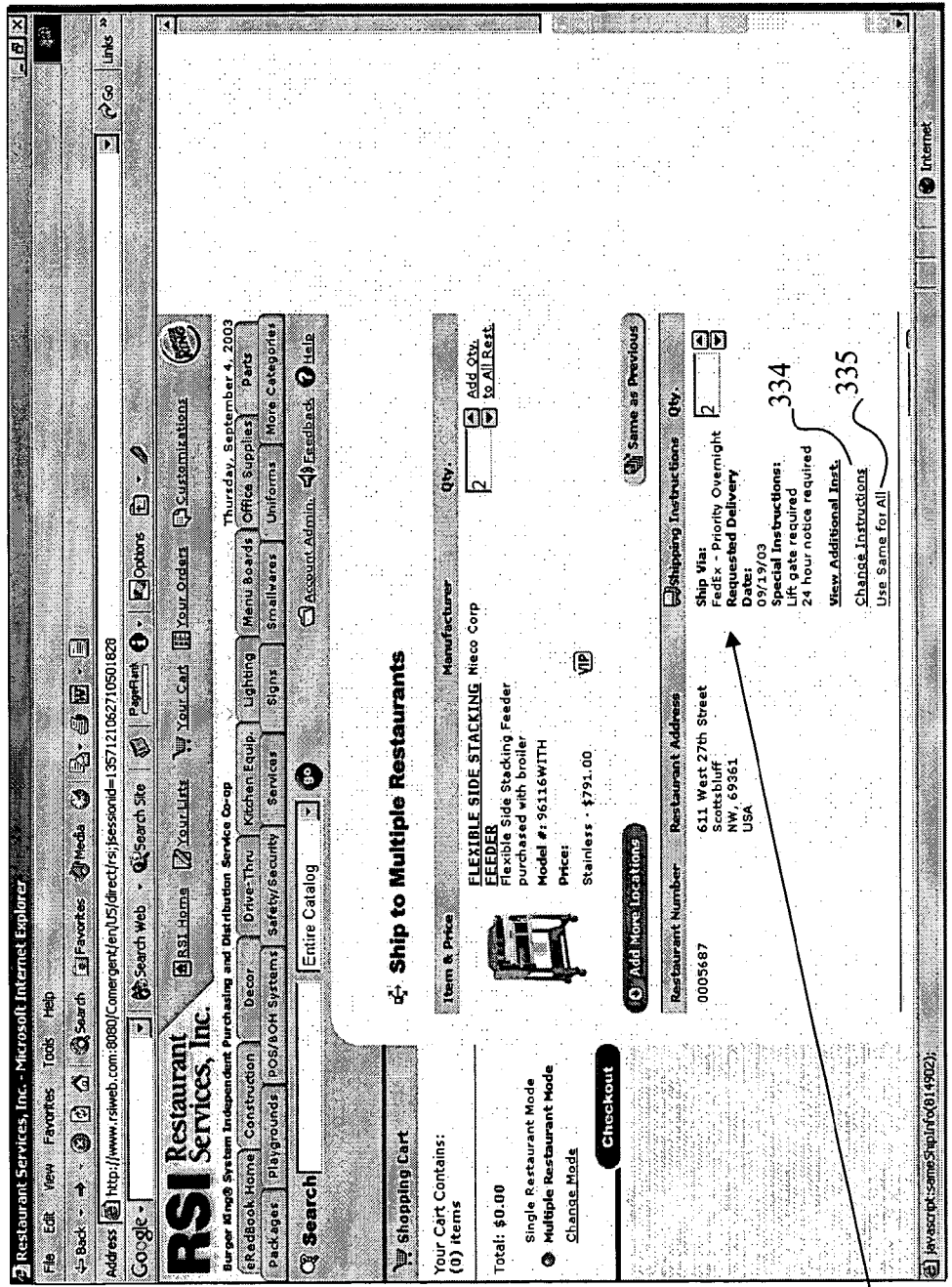
Figure 3N:
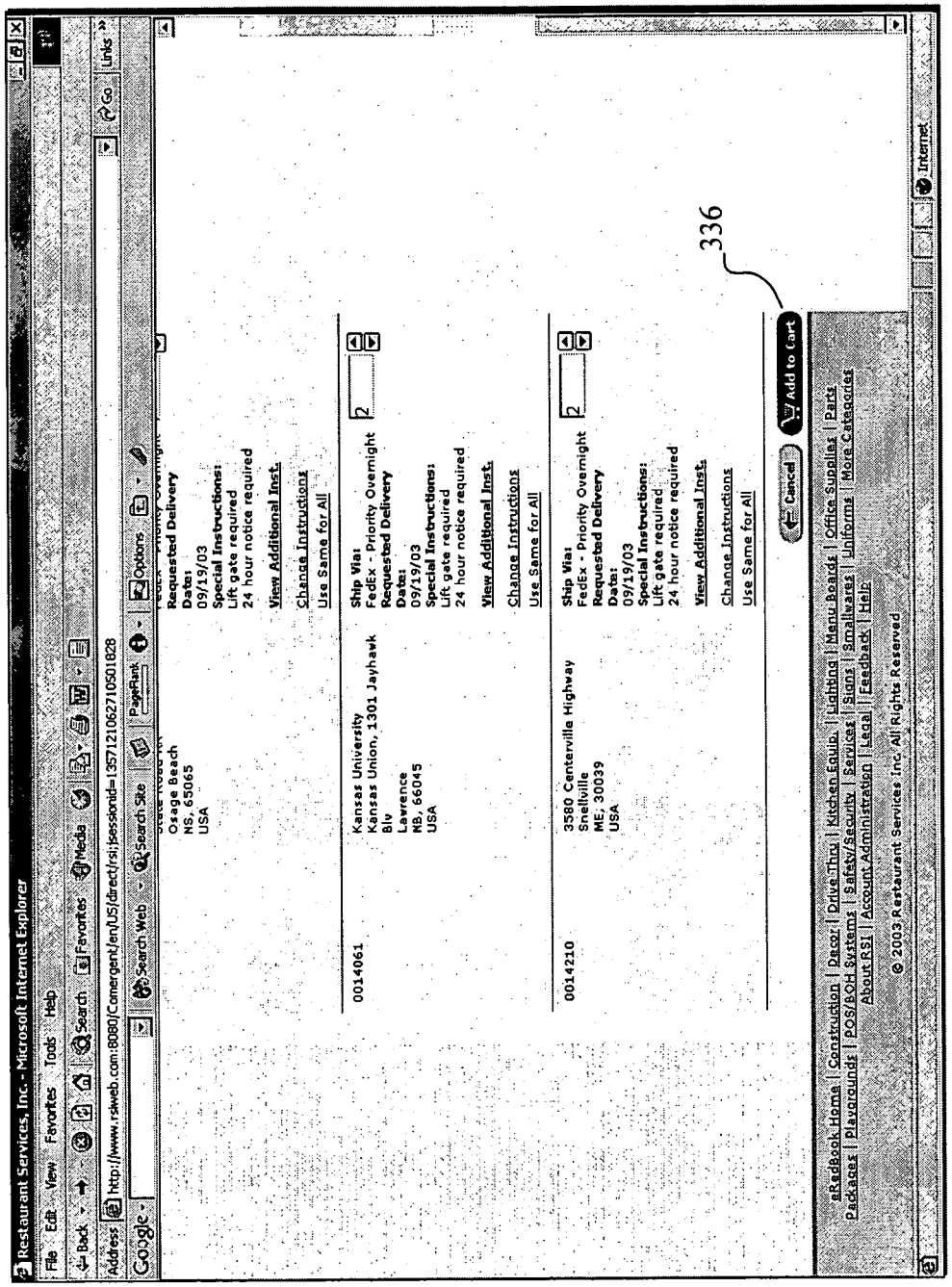
Figure 30:
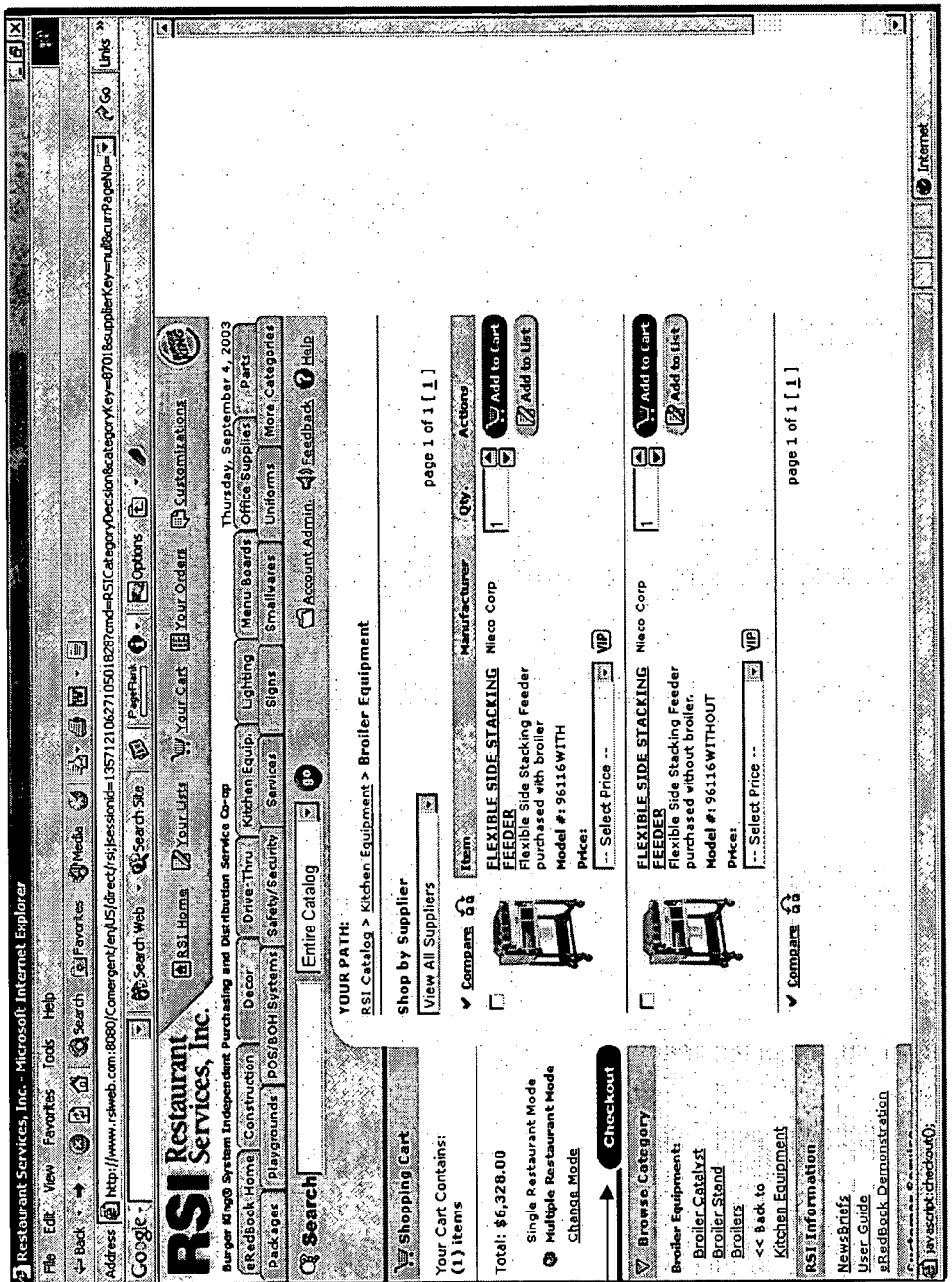
Figure 3P:
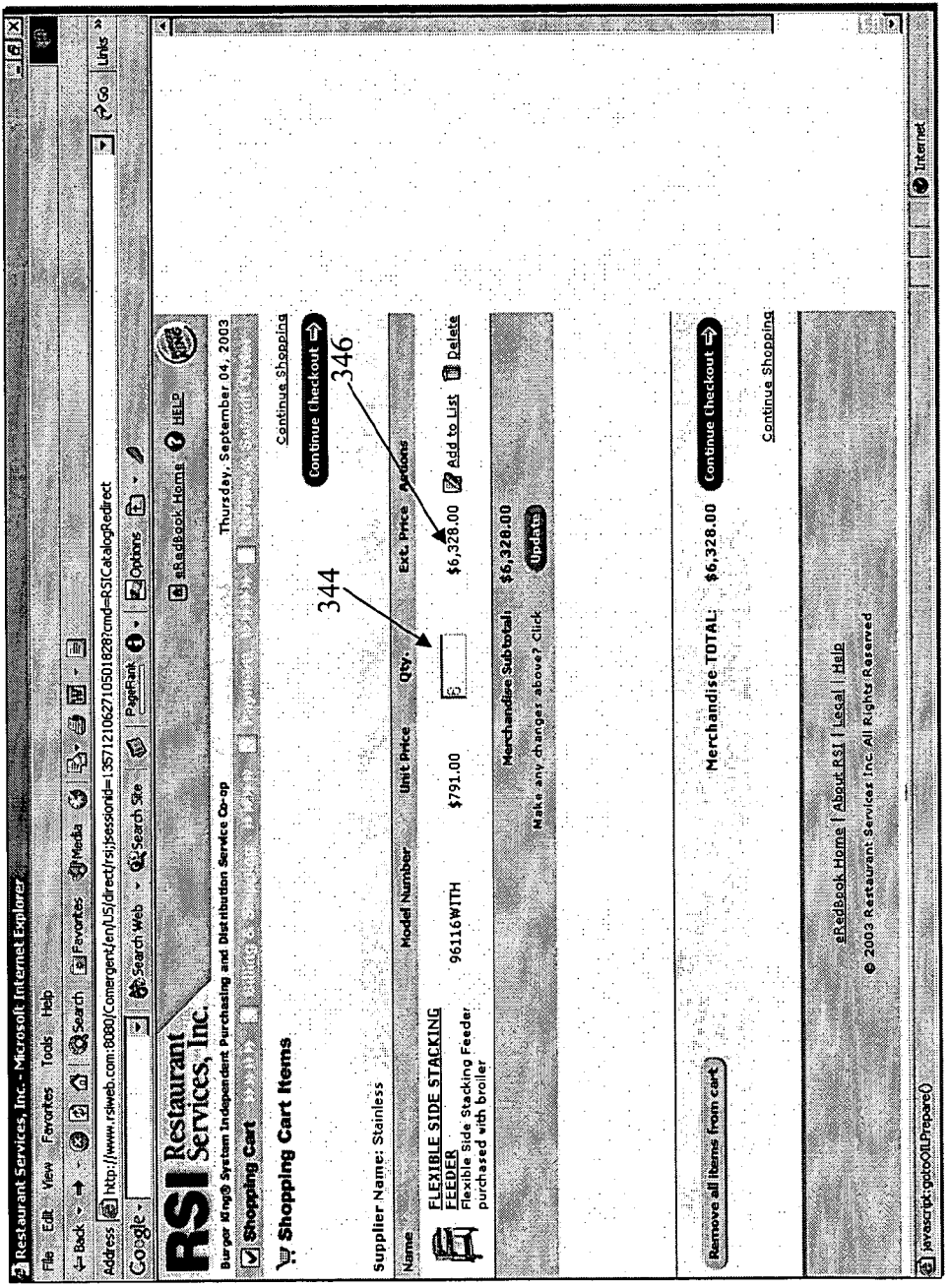
Figure 3Q:
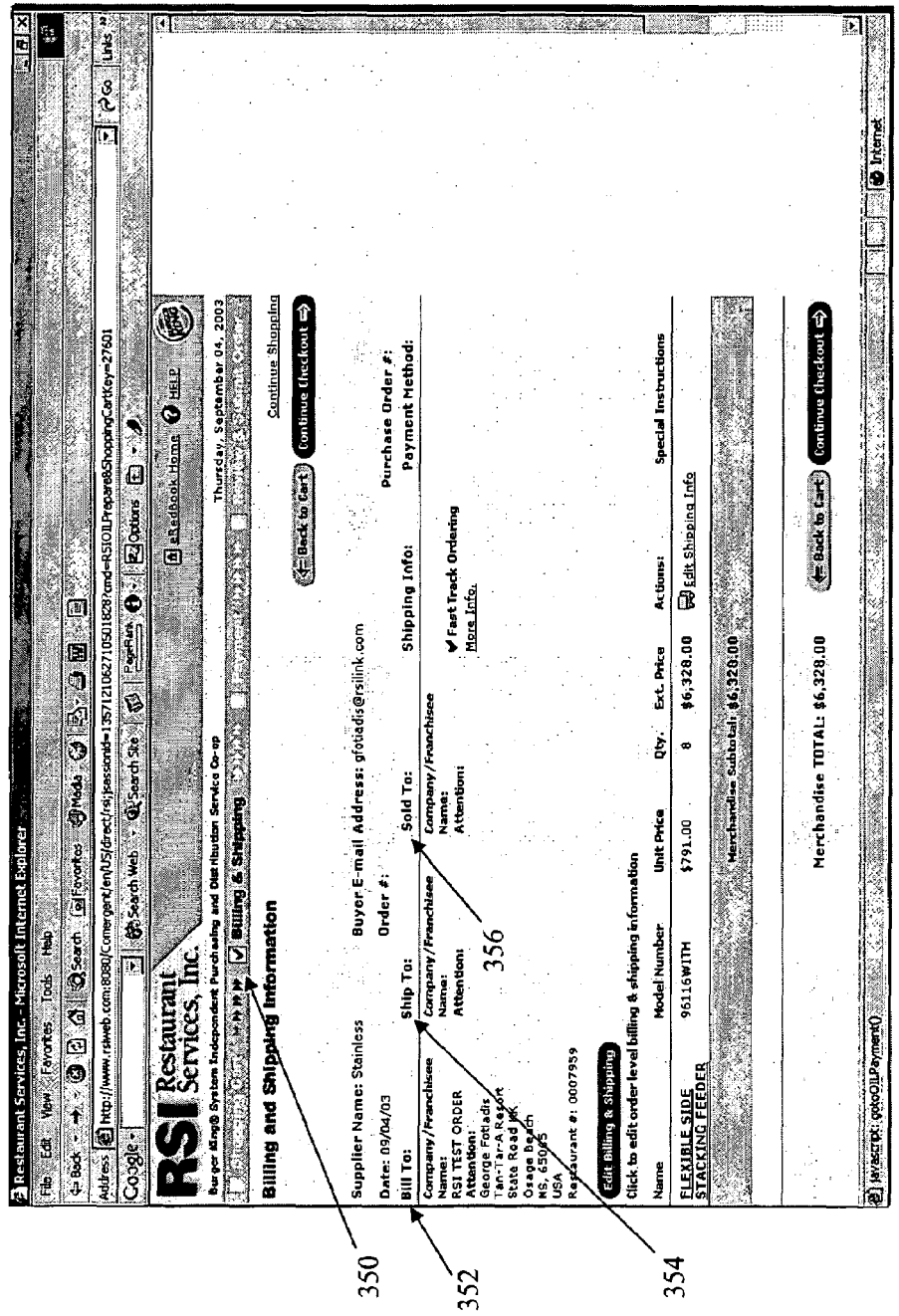
Figure 3R:
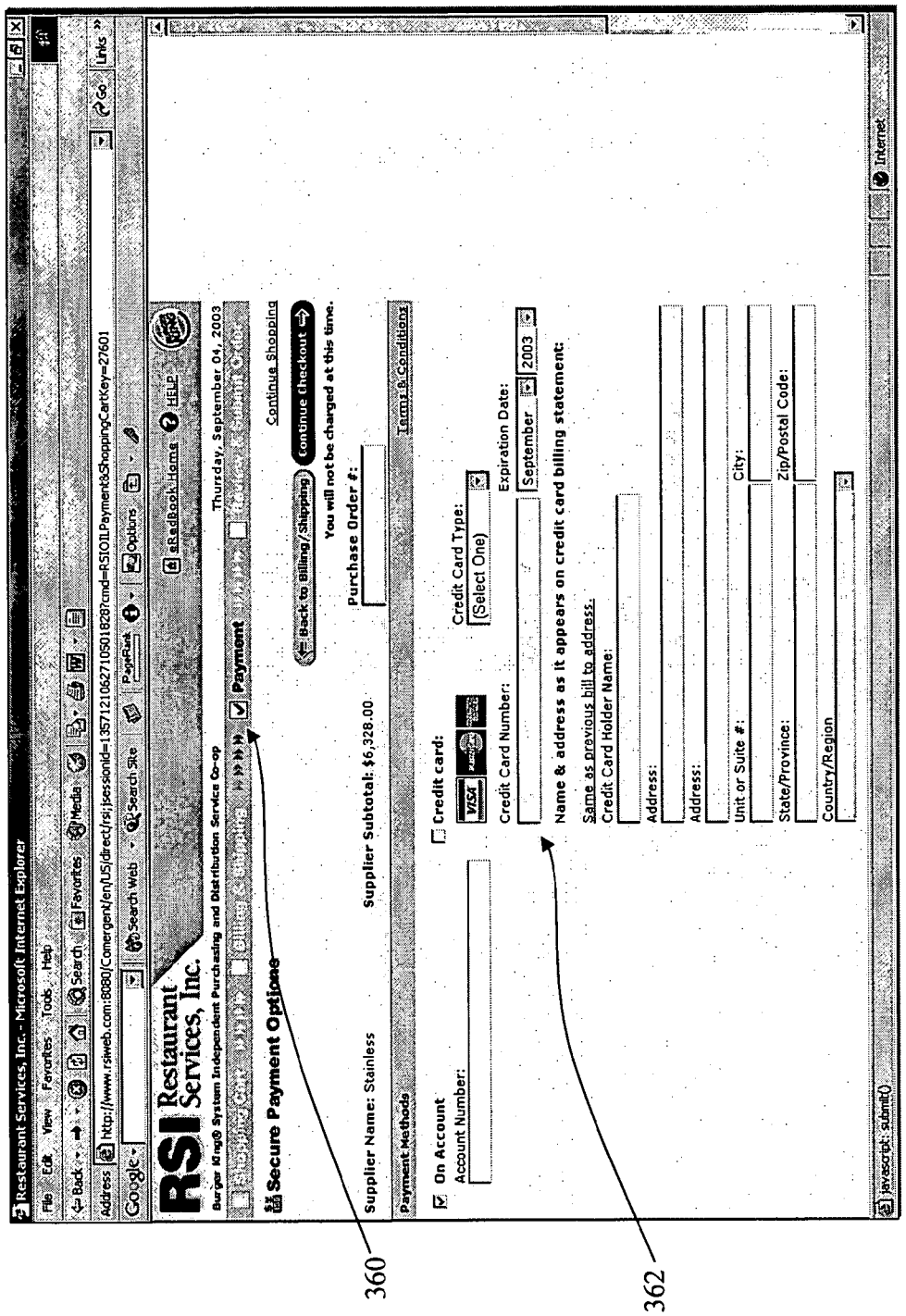
Figure 3S:
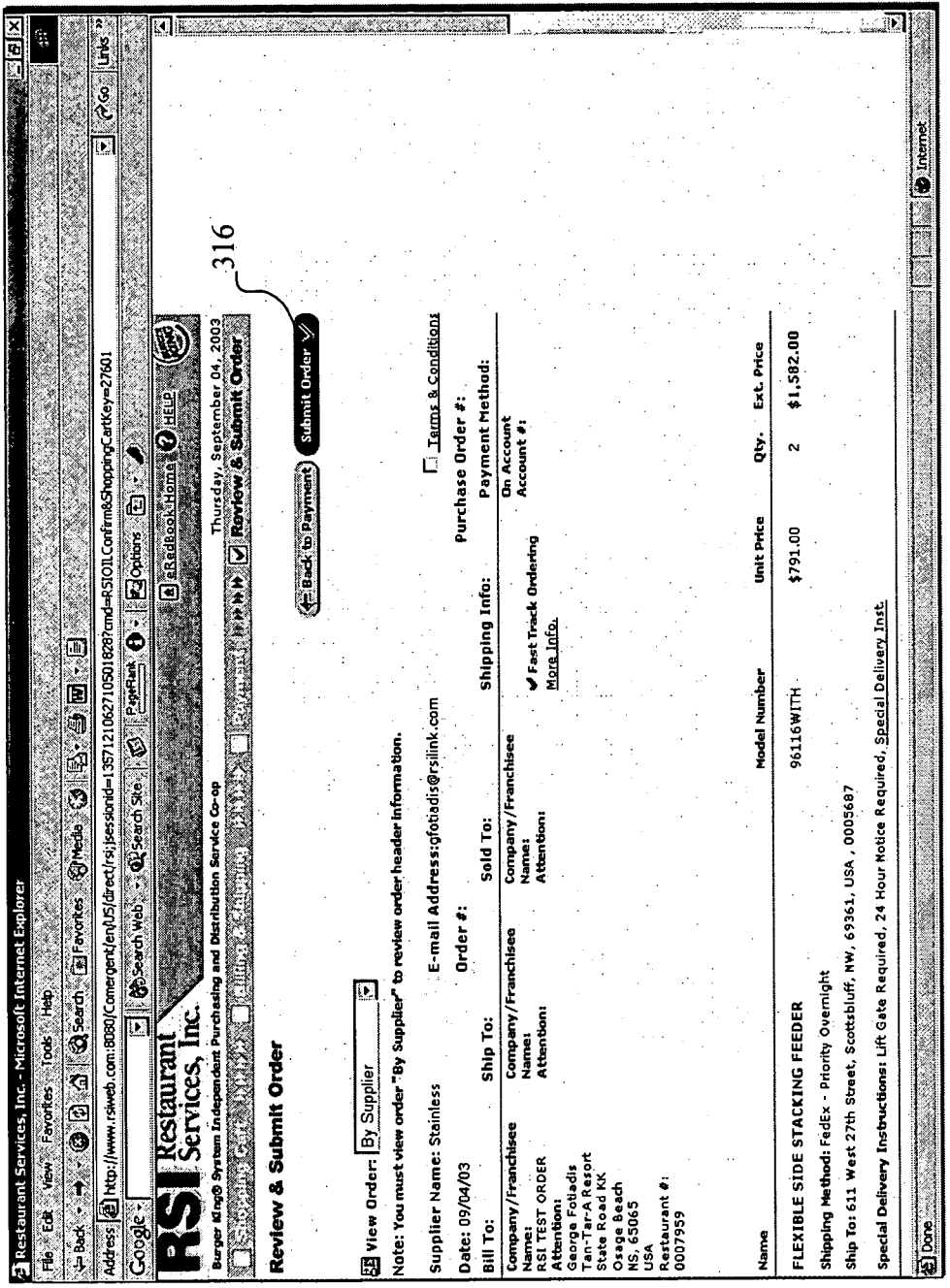
Figure 3T:
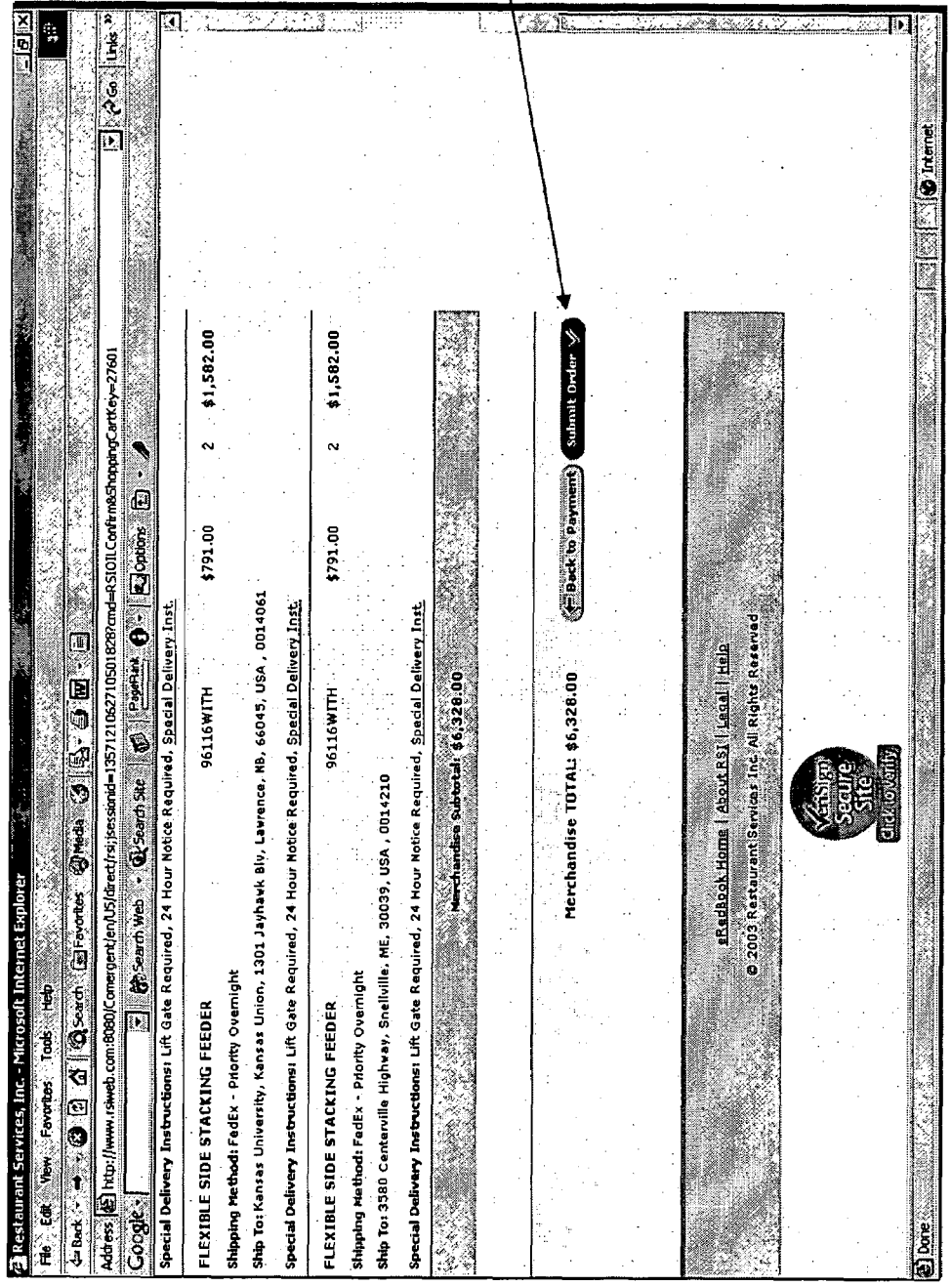
Figure 3U:
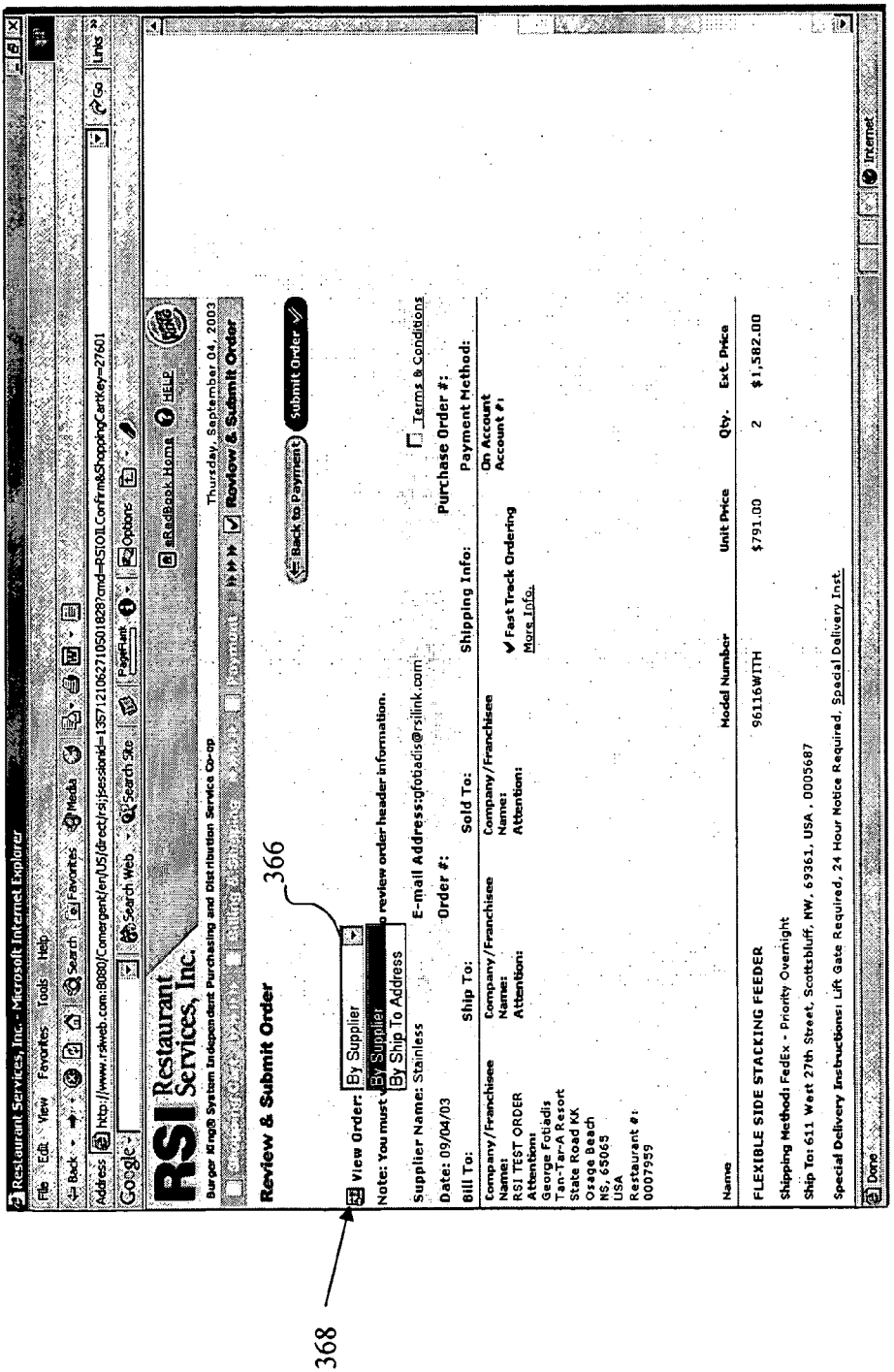
Figure 3V:
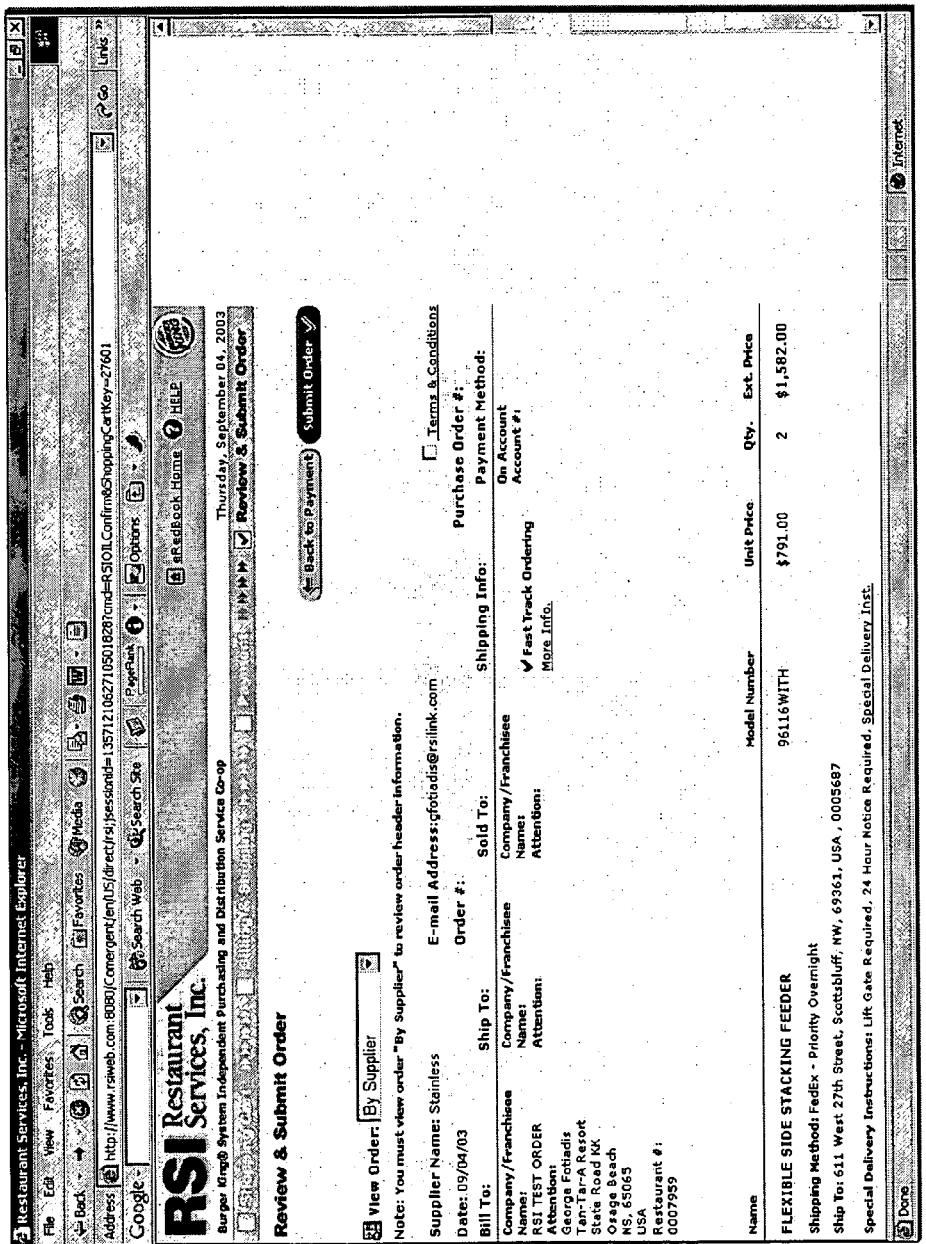
Figure 3X:
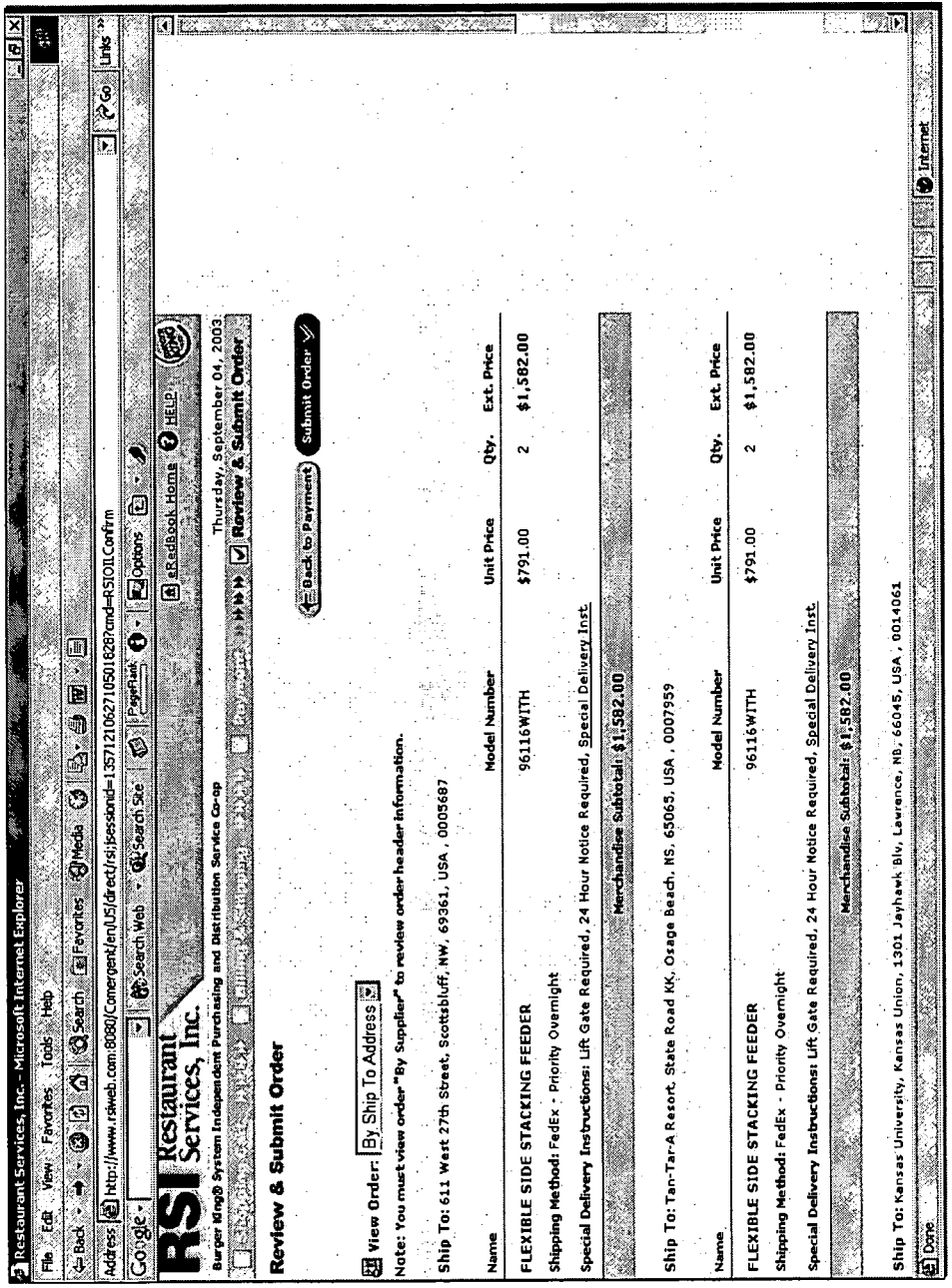
Figure 3Y:
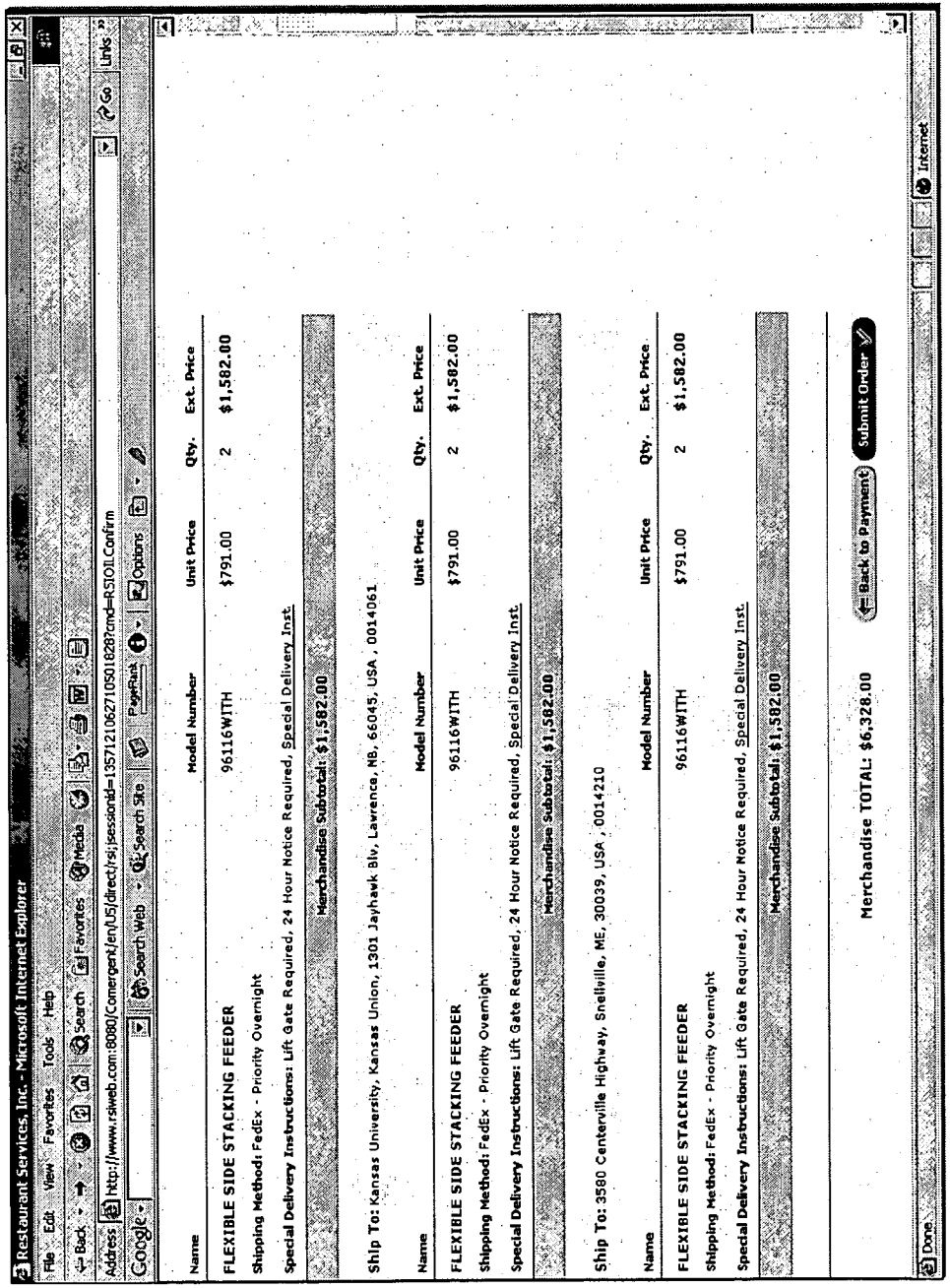

FIGS. 3A-3Y comprise a set of screen shots for a GUI of one embodiment of the present invention. FIG. 3A is an embodiment of a Home Page 300 for a supply chain management system. Note that by clicking the "Purchasing" button 302, a pull-down menu appears that includes a link to an "eCatalog." FIG. 3B illustrates the web page 306 that appears when the eCatalog button is clicked. Note that classes of equipment 308 are shown for this embodiment. For other embodiments, classes of food supplies could be displayed, or any other set of classes. Item 10 is a shopping cart listing.

FIG. 3C illustrates the web page that appears when the "Kitchen Equipment" tab is clicked. Note the "Browse Category" box 316 includes categories of equipment under the "Kitchen Equipment" class. There is also a brief explanation of the web page in the box 314.

FIG. 3D illustrates the web page that appears when the "Broiler Equipment" tab is clicked. Numeral 318 identifies the path up to this point. The different broilers available in the eCatalog are shown in the fields 320.

FIG. 3E illustrates the price box 322 that appears when the arrow adjacent to the price field is clicked for the top selection. The price box lists the prices for a Flexible Side Stacking Feeder with broiler in various different configurations and for different uses. FIG. 3F illustrates the web page when the "Food Service" price of $791.00 is clicked to enter that price into the price box 324. The item may be added to the buyer's shopping cart at this time by clicking the "Add to Cart" button 325. Note that there is also an adjacent "Add to List" button.

FIG. 3G is a web page that appears in order to allow the buyer to select between purchasing for a Single Restaurant via box 326, or for Multiple Restaurants via box 328. FIG. 3H is the web page that appears when the Multiple Restaurants box 328 is clicked. All of the restaurants managed by the given buyer manager supply system buyer ID appear as listings in the field 329. A quantity field 330 appears in adjacency to the listing of the equipment to be purchased. The buyer has the option of adding the quantity inserted into the field 330 into the quantity fields for all of the listed restaurants by the clicking the tab 331 "Add Qty. to All Rest." Alternatively, the buyer can simply apply a default quantity for the purchase by clicking the tab 332 labeled "Default." Clicking this tab 332 automatically populates the quantity field 333 for each of the given restaurants based on an attribute stored in the supply chain system for that restaurant. For example, a first restaurant may be of a size that it requires 3 fryers, while a second restaurant may be of a much smaller size that only requires 1 fryer. Thus, in a default mode, the system would automatically populate the first restaurant's quantity field 333 when fryers are being ordered with the number "3," while populating the second restaurant's quantity field 333 with the number "1." If neither of the tabs 331 or 332 is clicked, then the buyer may populate the quantity field for only one restaurant, or for a selected subset of restaurants, or for all of the restaurants, as desired. FIG. 3I is a web page with the quantity fields populated with the number "2" after the "Add Qty. to All Rest." Tab has been clicked. Note that in one embodiment the buyer may edit the quantity field at any time.

FIG. 3J is a web page that appears after the quantity field has been populated. Tab 334 labeled "Change Instructions" may be clicked in order to set and/or change shipping instructions. The tab 335 labeled "Use Same for All" may be clicked to use one shipping method for all of the restaurants. FIG. 3K is the web page that appears when the tab 334 "Change Instructions" is clicked. A listing of available shipping methods is displayed in a pop up window 336. FIG. 3L is the web page with the "FedEx—Priority Overnight" clicked in the "Available Shipping Methods" field, and the "Provide 24 Hour Notice of Shipping" and the "Request Lift Gate Delivery" options clicked in the "Special Instructions" field.

FIG. 3M is a web page showing the Shipping selection and Special Instructions selections associated with a particular restaurant at 340. The buyer may use these same shipping instructions for all of the remainder of the buyer's restaurants by clicking the tab 335 "Use Same for All." FIG. 3N illustrates a web page with the same shipping instructions and Special Instructions associated with each of the restaurants under the control of the particular buyer. Note that as an alternative to the above, the buyer could chose a default option (not shown), wherein preset shipping and Special Instructions are associated with the various restaurants. At this point the buyer may also click the button 336 labeled "Add to Shopping Cart."

In FIG. 3O the buyer is ready to check out, which may be accomplished in this embodiment by clicking the tab 342 labeled "Checkout." FIG. 3P shows the web page the appears when the "Checkout" tab is clicked. A quantity field 344 appears with the aggregated purchase quantity for all of the stores under the control/management of that particular buyer, along with an aggregated dollar amount field 346.

FIG. 3Q is the web page that appears for Billing & Shipping. See box 350. Note that there are fields for a name and address for each of "Bill To" 352, "Ship To" 354, and "Sold To" 356. These fields allow appropriate differentiation between billing, shipping and ultimate destinations and may optionally be specified by default after the restaurants are designated. Note that the "Ship To" field could have the name of a distributor, that would deliver the item ultimately to the Sold To restaurant. Note that placing the distributor in the Ship To field may occur when the items being purchased are food items, for example.

FIG. 3R is a web page that appears for the payment options 360. The payment details are provided in fields 362. FIGS. 3S and 3T comprises a web page that displays the final order for review and includes the tab 364 labeled "Submit Order."

FIG. 3U is a web page that illustrates a pop up box 366 that appears when the "View Order" tab 368 is clicked. The options in the pop up box are "By Supplier" and "By Ship To Address." FIGS. 3U and 3V illustrate the web page that appears when the "By Supplier" is clicked in the pop up box. Note that ther is no FIG. 3W. FIGS. 3X and 3Y illustrate the web page that appears when the "By Ship To Address" is clicked in the pop up box.

Figure 3Z:
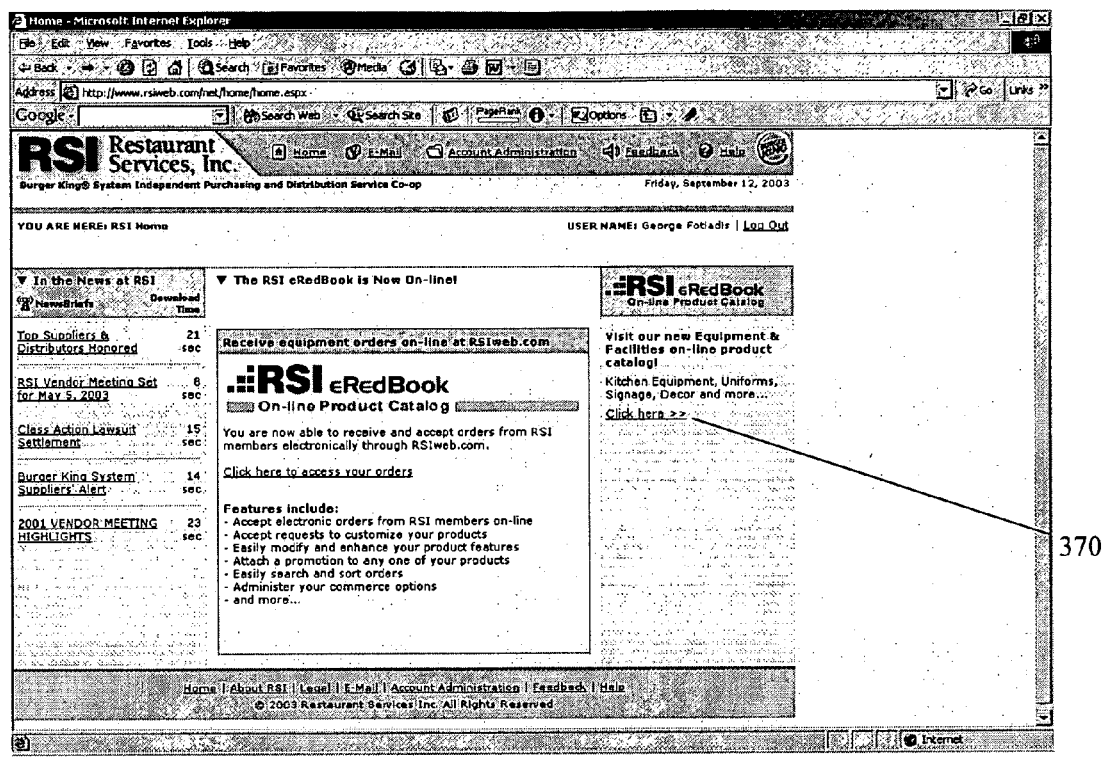
Figure 3A:
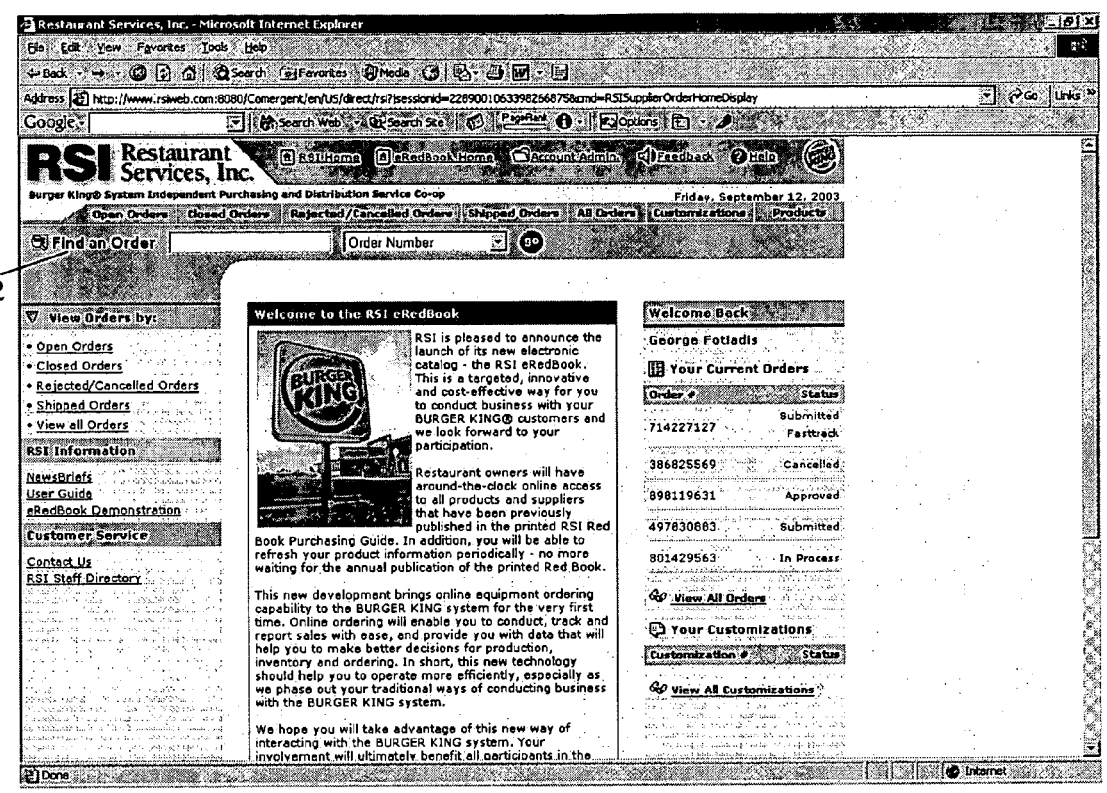

In a further embodiment of the present invention, a supplier fulfillment electronic form is provided to facilitate the buying transaction. For example, referring to FIG. 3Z, there is shown a supplier homepage, which may be served or otherwise presented to a supplier that logs into the system with an ID that is recognized as a supplier ID. A button or other indicator 370 is presented via web content on the display which will allow that supplier to view the status and process its orders.

FIG. 3AA is displayed to the supplier when the designator 370 is clicked or otherwise designated. A variety of designators are presented on the display to cause the system to generate and serve web pages that can list Open Orders 372, and various other orders such as Closed Orders, Rejected/Cancelled Orders, Shipped Orders, All Orders, Customizations, and Products. If the Open Orders designator 372 is clicked or otherwise designated, then FIG. 3BB is displayed. FIG. 3BB is a view organized by item for all items ordered by a selected order number. For FIG. 3BB the order number is 714227127. For each listed item, the stores for which that item has been ordered are listed. See also FIG. JJ. For example, in FIG. 3BB, all of the different store orders for a "1 Electric Fryer W/Built in Computer 208 volts" are listed in a grouping. It can be seen that one order goes to a store in Scottsbluff, Arizona, one goes to a store in Osage Beach, one goes to a store in Lawrence Kansas, one goes to a store in Snellville, Maine. These other listings are shown in FIGS. 3CC and 3DD.

It can be seen in FIG. 3BB that the quantity ordered 375, the price for the item 376, and the shipping method 377 have been imported from the system database or the buyer electronic order form. Additionally, a Quantity available at the suppliers warehouse field 378 is provided and can be populated automatically by the system based on information from the supplier or can be populated directly from the supplier's warehouse. In this instance, the supplier warehouse indicates that no items to fill this order are presently available and that the order is classified as a back order. When the supplier later indicates that there are units available, this order will be moved to being in process.

Continuing with Fig. BB, there are one or more open fields to be populated by the supplier in the figure. A first field that may be populated is a quantity to be shipped field 379. This field allows the supplier discretion to choose to which stores to fulfill the order, if the supplier only has a limited number of the item ordered. For example, assume a total of 6 fryers are ordered by the buyer ID that manages those stores, with 3 of those stores being located in New York state, within 50 miles of an FOB point of the supplier, and a fourth store located in Ohio 200 miles from a different supplier FOB point, and two other stores located in Kentucky 150 miles from a supplier FOB point. If the supplier only has a total of 3 of the items, the supplier could use its discretion to fulfill the order only for the stores in New York state.

FIG. 3BB also shows an open field 380 for a cost for shipping/handling to be populated and an open field 381 for a tax amount to be populated. FIG. 3CC shows an open field for an Estimated Ship Date 383, an Actual Ship Date 384, and a Tracking No. 385, which may also be populated.

A button or other designator 382 can be clicked or otherwise designated to populate at least one other store order with the information used to populate this first store order in the grouping. Thus, by designating the designator 382, all of the other stores will have their open fields 379, 380 and 381 populated with the quantity "1," the shipping/handling cost "$20," and the tax of "$20." Note that a designator 382 can be provided just one time per item grouping, or a designator 382 can be provided for each store order, as desired. The presence of such a designator 382 is particularly advantageous when the supplier is fulfilling order for a large number of stores, for example, two hundred or more stores.

A Continue Process button or other designator 387 on FIG. 3DD is provided when the required fields have been populated and the supplier wishes to send an electronic or other form of confirmation to the buyer ID and/or to the respective stores that will be receiving the item, or to a distributor that will delivering the items to the respective stores. Referring to FIG. 3EE, an electronic fulfillment form is shown organized by store, i.e., listing each stores associated with the buyer ID, and for that store listing all of the items that have been ordered from the supplier for that store. This organization is also illustrated in FIG. 3KK. This organization of the electronic fulfillment form may be obtained via a menu, which for example, may be displayed by clicking or otherwise designating the designator 388. Two choices are listed in the menu: Item and Address. The Item designator organizes the electronic fulfillment form by item, listing each store where that item is to be delivered, while the Address designator organizes the electronic fulfillment form by store.

In FIG. 3EE it can be seen that the quantity ordered amount 375 and the price 376 have been pre-populated. There are open fields to be populated for the Quantity Available 389, the Estimated Ship Date 390 and the Actual Ship Date 391 to allow, for example, a supplier representative processing the order to indicate how many units are available and other parameters. Likewise, a Use Same # for all designator 382 is provided to populate all of the remaining open fields with information used to populate these fields.

Referring to FIG. 3FF, the organization of the electronic fulfillment form is set to organize by address, i.e., listing each store with the items ordered for that store. See reference numeral 388 indicating the selection of "Address" as the organization for the electronic fulfillment form.

Referring to FIG. 3GG, a review page is retrieved and displayed when an Order Competed button or other indicator (not shown) is designated. FIGS. 3HH and 3II are continuation screens for the review page. These screens are organized by item, i.e., an item is listed with all of the different stores to which the item is to be shipped. On FIG. 3II, which is the last screen for the review page, an order total is provided, along with a button or other indicator 392 for "Ship Order."

Figure 4:
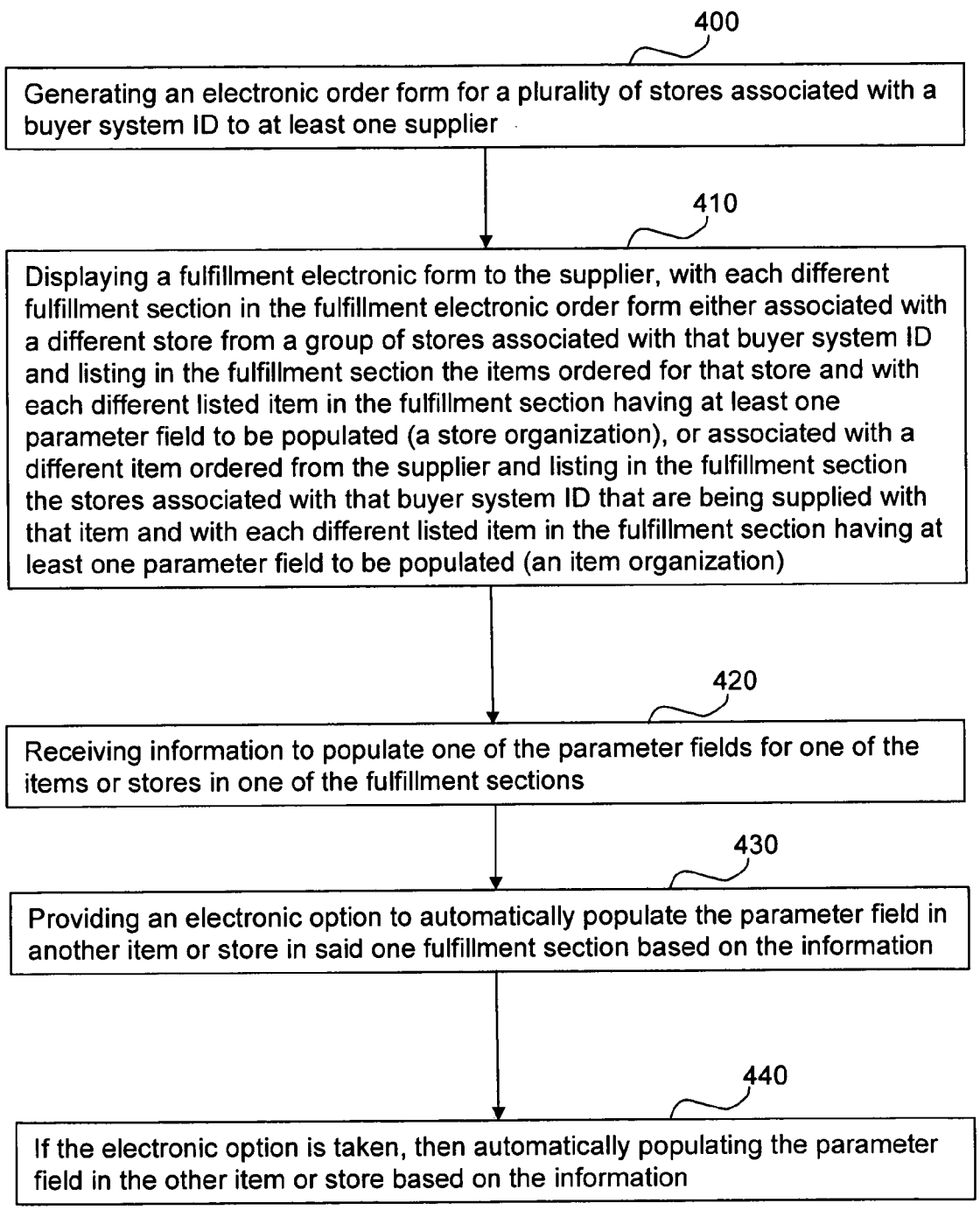
FIG. 4 is a flowchart for an implementation of a further embodiment of the present invention.

From the above, it can be seen that an additional aspect of the invention is a method, program product and system to populate a web display with data from the electronic order form and data from a supplier inventory and serve web content to a supplier listed in the electronic order form. A flowchart for this aspect is shown in FIG. 4. Referring to FIG. 4, in block 400 an electronic order form is generated for a plurality of stores associated with a buyer system ID to at least one supplier. In block 410, a fulfillment electronic form is displayed to the supplier, with each different fulfillment section in the fulfillment electronic order form either associated with a different store from a group of stores associated with that buyer system ID and listing in the fulfillment section the items ordered for that store and with each different listed item in the fulfillment section having at least one parameter field to be populated (a store organization), or associated with a different item ordered from the supplier and listing in the fulfillment section the stores associated with that buyer system ID that are being supplied with that item and with each different listed item in the fulfillment section having at least one parameter field to be populated (an item organization);

Continuing in FIG. 4, in block 420, information is received to populate one of the parameter fields for one of the items in a store organization or one of the stores in an item organization in one of the fulfillment sections. In block 430, an electronic option is provided to automatically populate the parameter field in another item or store in the one fulfillment section based on the information. In block 440, if the electronic option is taken, then automatically populating the parameter field in the other item or store based on the information.

In one embodiment, program code is provided for the displaying, receiving, providing and automatically populating steps that comprises web content. In one embodiment, the parameter field is an item quantity field. In another embodiment, the parameter field is a shipping/handling field. In a further embodiment, the parameter field is a tax amount field. In a further embodiment, program code is provided to present an indicator that may be activated to cause a confirmation to be sent to the buyer. In a further embodiment, the parameter field is a quantity available field in a store fulfillment section. In a further embodiment, the parameter field is an estimated ship date in a store fulfillment section.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A program product for a computer-implemented product ordering process for a plurality of buyers, with each buyer ordering for at least one store, comprising machine-readable program code to be executed, comprising:
   one or more computer-readable media having machine-readable program code embodied therein or among them if more than one computer-readable medium, to be executed by a computer, the computer-readable program code comprising,
      program code for receiving in a supply chain system from a buyer who has entered a buyer system ID an indication of an item to order;
      program code for causing generation of a display that provides at least a first electronic selection and a second electronic slection to a user, with the first electronic slection to generate an order for an individual store only, and the second electronic selection to generate on a single form and order for a plurality of stores of the buyer;
      program code for displaying, when the second electronic selection is reveived, a single fulfillment electronic for, with an electronic display interface that presents at least a third electronic selection and a fourth electronic selection, to allow a user to selct either a store organization with the third electronic sleection or an item organization with tthe fourth electronic slection for the single fulfillment electronic form,
         with the store organization comprising displaying each of a pluarality of different fulfillment sections in the fulfillment electronic order form associated with a different store from a group of stores associated with that buyer system ID and listing in the fulfillment section one or more items ordered for that store and with each different listed item in the fulfillment section having at least one parameter field to be populated, and
         with the item organization comprising displaying each of a plurality of different fulfillment sections in the fulfillment electronic order form associated with a different item ordered and listing in the fulfillment section the group of stores associated with that buyer system ID that are to be supplied with that item and with each different listed item in the fulfillment section having at least one parameter field to be populated; program code capable of receiving information to populate one of the parameter fields for one of the items in a store organization; program code capable of receiving information to potulate the parameter field, in an item organization, for one of the stores in one of the fulfillment sections;
   program code for sending out the electronic order form to at least one supplier.

2. The program product as defined in claim 1, further comprising program code for providing a graphical buyer interface that presents an electronic selection to automatically populate the order amount field for each of a plurality of the stores with a quantity entered in the order amount field for one of the stores.

3. The program product as defined in claim 1, wherein the designation for each store includes an address for the store.

4. The program product as defined in claim 1, wherein data for a plurality of the stores include an attribute associated therewith; and
   wherein an order amount field for a plurality of the stores with said attribute is determined automatically, at least in part, by the attribute.

5. The program product as defined in claim 1, wherein the electronic order form comprises a plurality of different items, with each of a plurality of the different items to be supplied by a different supplier, with each different supplier having a different portion of the electronic order form activated therefor.

6. The program product as defined in claim 1, wherein the program code for causing display of an electronic order form comprises including a segmented permission portion in the electronic order form so that each of a plurality of different buyer sysrtem ID's can enter data on a different portion only of the electronic order form, which portion is associated with at least one store associated with that buyer system ID.

7. The program product as defined in claim 1, further comprising program code for providing a display interface to designate same shipping address for each store associated with the buyer system ID.

8. The program product as defined in claim 1, wherein an intermediate shipping address is included on the electronic order form for one of the stores.

9. The program product as defined in claim 1, further comprising program code for comparing a monetary amount from the electronic order form for given store to a threshold amount; and generating a message if the threshold amount is exceeded.

10. The program product as defined in claim 1, further comprising program code for aggregating a dollar amount from a plurality of completed electronic order forms from different buyer system ID's that manage different sets of stores for a given customer; comparing the aggregated dollar amount to a threshold amount; and generating a message if the threshold amount is exceeded.

11. The program product as defined in claim 1, wherein the stores are restaurants.

12. The program product as defined in claim 1, wherein the program code for the displaying, receiving, providing and automatically populating steps comprise web content.

13. The program product as defined in claim 1, wherein the parameter field is an item quantity field in an item fulfillment section.

14. The program product as defined in claim 1, wherein the parameter field is a shipping/handling field in an item fulfillment section.

15. The program product as defined in claim 1, wherein the parameter field is a tax amount field in an item fulfillment section.

16. The program product as defined in claim 1, wherein the parameter field is a quantity available field in a store fulfillment section.

17. The program product as defined in claim 1, wherein the parameter field is an estimated ship date field in a store fulfillment section.

18. The program product as defined in claim 1, further comprising program code to present an indicator that may be activated to cause a confirmation to be sent to the buyer.

19. The program product as defined in claim 1, wherein the receiving a selection step comprises providing a display of selected electronic catalogue items from different vendors for a piece of equipment; and wherein the indication is of one of the catalogue items displayed from the electronic catalogue items.

20. The program product as defined in claim 1, further comprising program code for
populating web content with data from the elctronic order for and data from a supplier inventory to obtain an electronic fulfillment form; and
serving the web content to a supplier listed in the electronic order form.

21. A system for a computer-implemented product ordering process for a plurality of buyers, with each buyer ordering for at least one store, comprising:
one or more computers comprising therein or among them if more than one;
logic for receiving in a supply chain system from a buyer who has entered a buyer system ID and indication of an item to order;
logic for sending data to cause generation of a display that provides at least a first electronic selection and a second electronic to a user, with the first electronic selection to generate an order for an individual store only, and the second electronic selection to generate on a single for an order for a plurality of stores of the buyer;
logic for displaying, when the second electronic selection is received, a single fulfillment electronic form, with an electronic display interface that presents at least a third electronic selection and a fourth electronic selection, to allow a user to select either a store organization with the third electronic selection or an item organization with the fourth electronic selection for the single fulfillment electronic form,
with the store organization comprising, displaying each of a plurality of idfferent fulfillment sections in the fulfillment electronic order form associated with that buyer system ID and listing in the fulfillment section one or more items ordered for that store and with each different listed item in the fulfillment section having at least one parameter field to be populated, and
with the item organization comprising, displaying each of a plurality of different fulfillment sections in the fulfillment electronic order form associated with a different item ordered and listing in the fulfillment section the group of stores associated with that buyer system ID that are to be supplied with that item and with each different listed item in the fulfillment section having at least one parameter field to populated;
logic capable of receiving information to populate one of the parameter fields for one of the items in a store organization;
logic capable of receiving information to populate the parameter field, in an item organization, for one of the stores in one of the fulfillment sections;
logic for sending out the electronic order form to at least one supplier.

22. The system as defined in claim 21, further comprising logic for presenting a graphical buyer interface provided to present a selection to automatically populate the order amount field for each of a plurality of the stores with a quantity entered in the order amount field for one of the stores.

23. The system as defined in claim 21, wherein a plurality of the stores include an attribute associated therewith; and
further comprising logic for populating the order amount field automatically for a store based, at least in part, by an attribute associated with the store.

24. The system product as defined in claim 21, wherein the electronic order form comprises a plurality of different items, with each of a plurality of the different items to be supplied by a different supplier, with each different supplier having a different portion of the electronic order form activated therefor.

25. The system as defined in claim 21, wherein the logic for displaying electronic order form facilitates a segmented permission portion thereon so that each of a plurality of different buyer system ID's can enter data on a different portion only of the electronic order form, which portion is associated with at least one store associated with that buyer system ID.

26. The system as defined in claim 21, further comprising logic for sending data to present display interface to designate a same shipping address for each store associated with the buyer system ID.

27. The system as defined in claim 21, further comprising logic for comparing a monetary amount from the electronic order form for given store to a threshold amount; and generating a message if the threshold amount is exceeded.

28. The system as defined in claim 21, further comprising logic for aggregating a dollar amount from a plurality of completed electronic order forms from different buyer system ID's that manage different sets of stores for a given customer; comparing the aggregated dollar amount to a threshold amount; and generating a message if the threshold amount is exceeded.

29. The system as defined in claim 21, wherein the stores are restaurants.

30. The system as defined in claim 21, wherein the parameter field is an item quantity field in an item fulfillment section.

31. The system as defined in claim 21, wherein the parameter field is a shipping/handling field in an item fulfillment section.

32. The system as defined in claim 21, wherein the parameter field is a tax amount field in an item fulfillment section.

33. The system as defined in claim 21, wherein the parameter field is a quantity available field in a store fulfillment section.

34. The system as defined in claim 21, wherein the parameter field is an estimated ship date field in a store fulfillment section.

35. The system as defined in claim 21, further comprising logic to present an indicator that may be activated to cause a confirmation to be sent to the buyer.

36. The system as defined in claim 21, further comprising logic for sending data to provide a display of selected electronic catalogue items from different vendors for a piece of equipment; and wherein the indication is of one of the catalogue items displayed from the electronic catalogue.

37. The system as defined in claim 21, further comprising
logic for populating a web display with data from the electronic order form and data from a supplier inventory to obtain an electronic fulfillment form; and
logic for serving web content to a supplier listed in the electronic order form.

38. A method for a computer-implemented product ordering process for a plurality of buyers, with each buyer ordering for at least one store, comprising:
receiving electronically in a supply chain system from a buyer who has entered a buyer system ID an indication of an item to order;
providing a display that provides at least a first electronic slection and a second electronic to a user, with the first electronic slection to generate an order for an individual store only, and the seond electronic slection to generate on a single for an order for a plurality of stores of the buyer;
displaying, when the second electronic selection is received, a single fulfillment electronic form, with an electronic display interface that presents at least a third electronic slection and a fourth electronic selection, to allow a user to select either a store organization with the third electronic selection or an item organization with the fourth electronic selection for the single fulfillment electronic form,
with the store organization comprising displaying each of a plurality of different fulfillment sections in the fulfillment electronic order form associated with a different store from a group of stores associated with that buyer system ID and listing in the fulfillment section one or more items ordered for that store and with each different listed item in the fulfillment section having at least one parameter field to be populate, and
with the item organization comprising displaying each of a pluarality of different fulfillment sections in the fulfillment electronic order form associated with a different item ordered and listing in the fulfillment section the group of stores associated with that buyer system ID that are to be supplied with that item and with each different listed item in the fulfillment section having at least one parameter field to be populate;
receving information to populate one fo the parameter fields in either the store or the item organization;
sending out the electronic order form to at least one supplier.

39. The method as defined in claim 38, further comprising sending data to present a graphical buyer interface with an option to automatically populate the order amount field for each of a plurality of the stores with a quantity entered in the order amount field for one of the stores.

40. The method as defined in claim 38, wherein a plurality of the stores include an attribute associated therewith; and
wherein an order amount field for a plurality of the stores with said attribute is determined automatically, at least in part, by the attribute.

41. The method as defined in claim 38, wherein the receiving a selection step comprises providing a display of selected electronic catalogue items from different vendors for a piece of equipment; and wherein the indication is of one of the catalogue items displayed from the electronic catalogue.

42. The method as defined in claim 38, further comprising populating a web display with data from the electronic order form and data from a supplier inventory to obtain an electronic fulfillment form; and
serving web content to a supplier listed in the electronic order form.

\* \* \* \* \*